United States Patent
Kramer

(10) Patent No.: US 10,196,786 B2
(45) Date of Patent: Feb. 5, 2019

(54) LAWN SWEEPER

(71) Applicant: Remark Technologies, Inc., Rockford, IL (US)

(72) Inventor: Rodney M. Kramer, Rockford, IL (US)

(73) Assignee: REMARK TECHNOLOGIES, INC., Rockford, IL (US)

( * ) Notice: Subject to any disclaimer, the term of this patent is extended or adjusted under 35 U.S.C. 154(b) by 599 days.

(21) Appl. No.: 14/725,907

(22) Filed: May 29, 2015

(65) Prior Publication Data

US 2016/0316636 A1 Nov. 3, 2016

Related U.S. Application Data

(63) Continuation-in-part of application No. 14/698,420, filed on Apr. 28, 2015, now abandoned.

(51) Int. Cl.
| | | |
|---|---|---|
| *E01H 1/04* | (2006.01) | |
| *E01H 1/05* | (2006.01) | |
| *A46B 13/02* | (2006.01) | |
| *A01G 20/43* | (2018.01) | |

(52) U.S. Cl.
CPC ............ *E01H 1/047* (2013.01); *A01G 20/43* (2018.02); *A46B 13/02* (2013.01); *E01H 1/045* (2013.01); *E01H 1/05* (2013.01)

(58) Field of Classification Search
CPC ........ A01G 1/125; E01H 1/045; E01H 1/047; E01H 1/04; E01H 1/05
USPC ................................ 15/79.1, 79.2, 79, 82, 83
See application file for complete search history.

(56) References Cited

U.S. PATENT DOCUMENTS

| | | | | |
|---|---|---|---|---|
| 1,448,385 A | * | 3/1923 | Bryant | E01H 1/045 15/79.1 |
| 2,146,952 A | * | 2/1939 | Hamren | A01G 3/0255 30/249 |
| 2,148,841 A | * | 2/1939 | Senior | A01B 49/04 15/23 |
| 2,156,065 A | | 4/1939 | Royer | |
| 3,038,735 A | | 6/1962 | Wistrom et al. | |
| 3,493,987 A | | 2/1970 | Longnecker | |

(Continued)

FOREIGN PATENT DOCUMENTS

KR 20140090486 A 7/2014

OTHER PUBLICATIONS

Precision, 38" Lawn Sweeper Owner's Manual, Precision Products Inc., Jul. 2012, 16 pages.

*Primary Examiner* — Randall Chin
(74) *Attorney, Agent, or Firm* — Fitch, Even, Tabin & Flannery LLP

(57) ABSTRACT

In accordance with one aspect, a lawn sweeper for being towed by a lawn tractor including a body, a rotatable brush mounted to the body, and a motor for rotating the brush independently of the rotation of at least one wheel of the lawn sweeper. The lawn sweeper further includes a remote control for being operated by a user of the lawn tractor to control the motor. In another aspect, a lawn sweeper having a pair of wheels rotatable about a wheel axis, a body shiftable between raised and lowered positions relative to the wheels, and brush mounted to the body and rotatable about a brush axis. The brush axis is substantially vertically aligned with the wheel axis when the body is in the raised position and the lowered position.

31 Claims, 18 Drawing Sheets

(56) References Cited

U.S. PATENT DOCUMENTS

| | | | |
|---|---|---|---|
| 3,597,786 A * | 8/1971 | Ruhl | A01D 43/07 15/79.1 |
| 4,279,056 A * | 7/1981 | Jacobson, Jr. | E01C 23/0906 15/373 |
| 4,796,322 A | 1/1989 | Steed et al. | |
| 5,218,732 A * | 6/1993 | Pettigrew | A47L 11/282 15/82 |
| 6,550,089 B1 * | 4/2003 | Ussen | A47L 13/38 15/3 |
| 6,595,737 B1 | 7/2003 | Parish | |
| 7,320,147 B2 * | 1/2008 | Eberle | A01G 20/43 15/79.1 |
| 7,430,848 B2 | 10/2008 | Suhara et al. | |
| 7,716,773 B1 * | 5/2010 | Pahl | A01G 20/43 15/83 |
| 8,056,177 B2 | 11/2011 | Hammad | |
| 8,359,694 B2 | 1/2013 | Johnson et al. | |
| 8,393,039 B2 * | 3/2013 | Johnson | A01G 1/125 15/83 |
| 8,549,689 B2 | 10/2013 | Johnson et al. | |
| 2005/0155170 A1 * | 7/2005 | Charky | B60K 5/08 15/78 |
| 2006/0230557 A1 * | 10/2006 | Zellefrow | A01G 20/43 15/82 |

\* cited by examiner

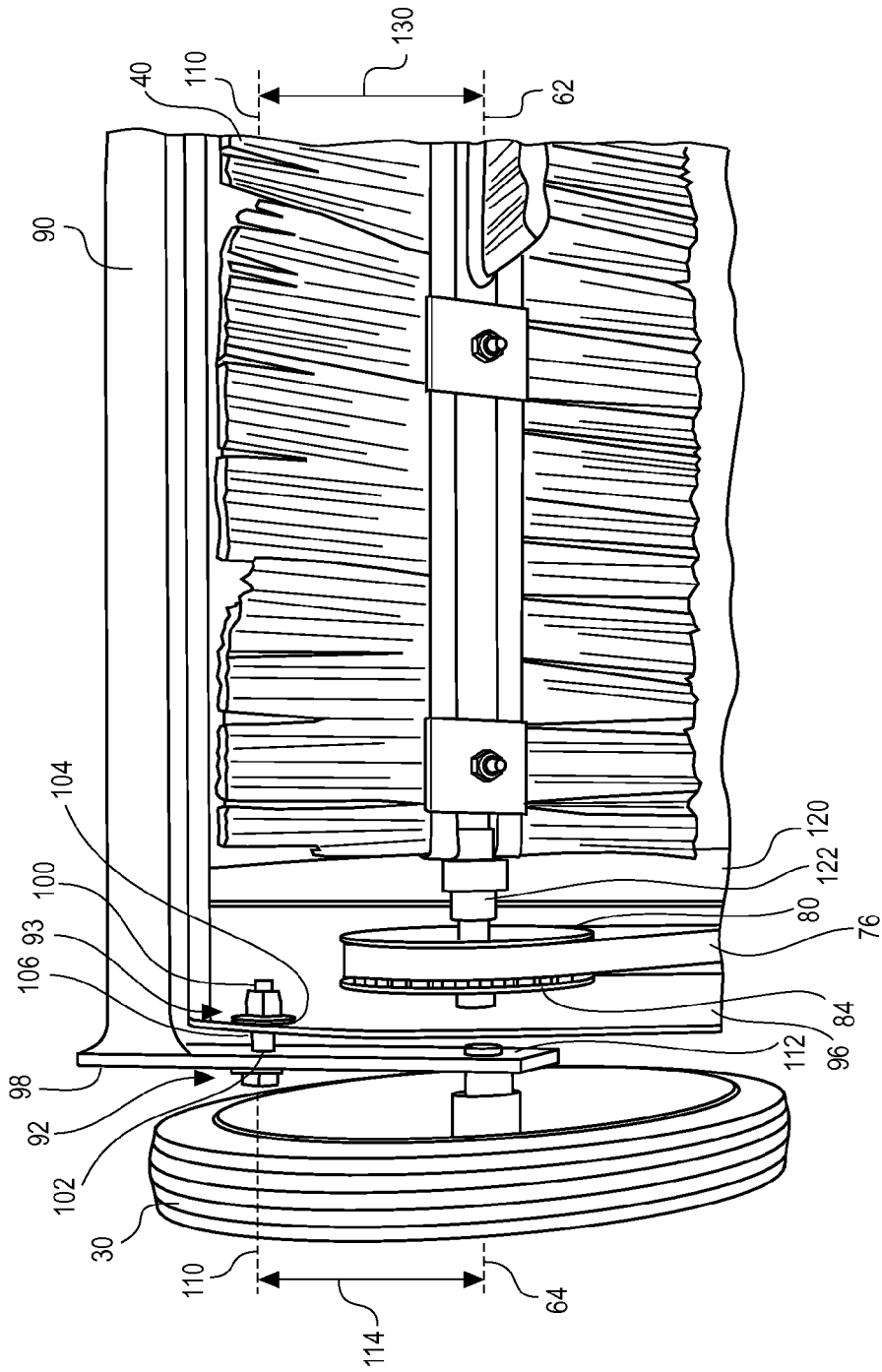

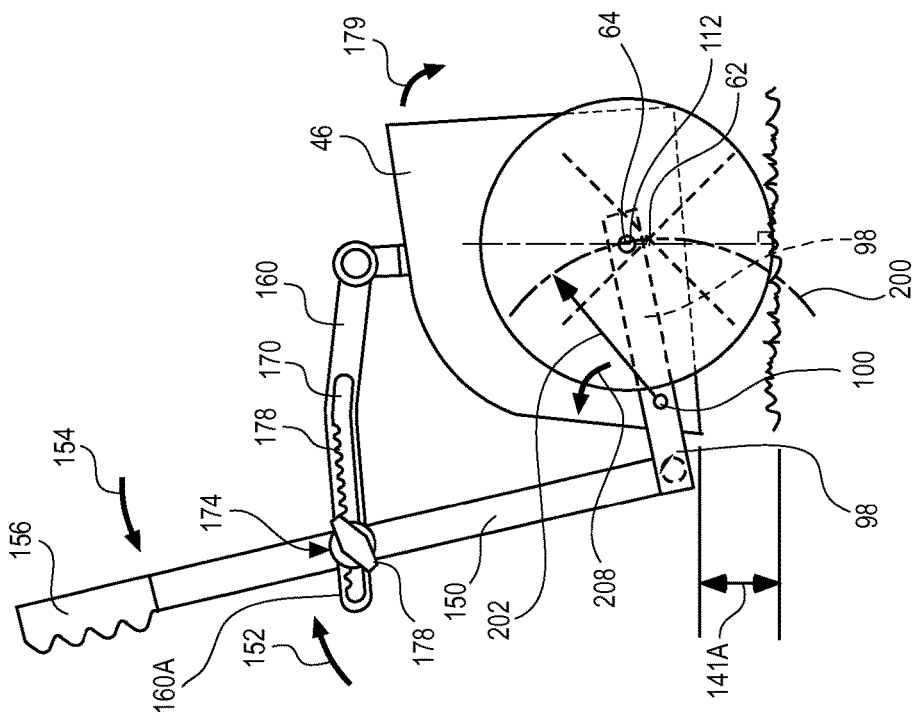
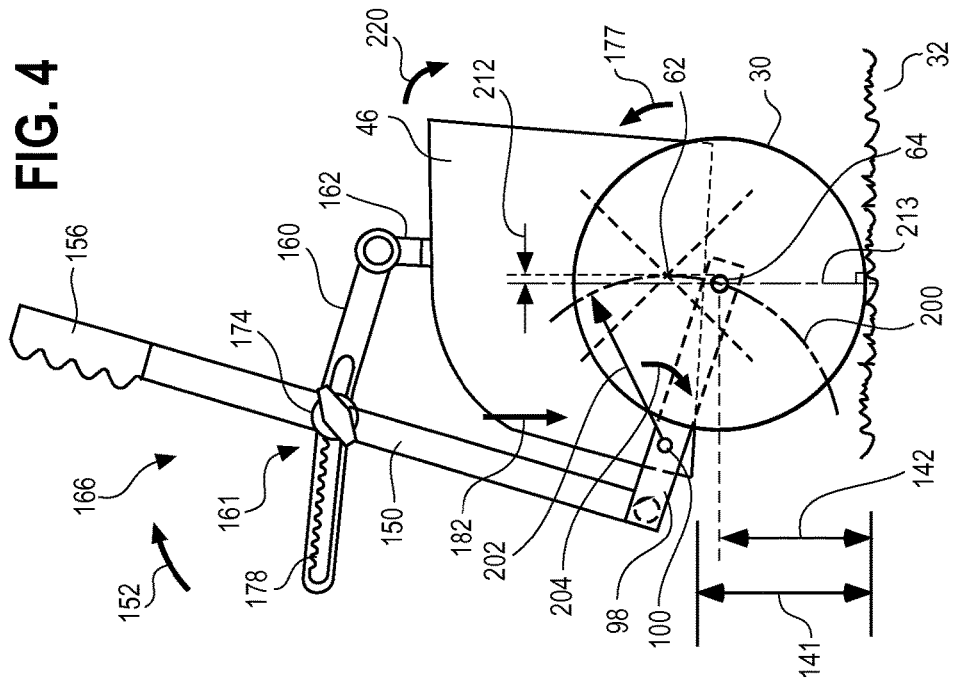

LAWN SWEEPER

CROSS-REFERENCE TO RELATED APPLICATION

This application is a continuation-in-part of U.S. patent application Ser. No. 14/698,420, filed Apr. 28, 2015, now abandoned, which is hereby incorporated by reference herein in its entirety.

FIELD OF THE INVENTION

The invention relates to lawn sweepers and, more particularly, to lawn sweepers where a user walks behind the lawn sweeper and lawn sweepers that are towed or otherwise propelled by a vehicle.

BACKGROUND

Lawn sweepers for sweeping material off of lawns, driveways, or other surfaces are known. The material may be grass clippings, leaves, branches, nuts, rocks, or other particles. There are various types of lawn sweepers including lawn sweepers that are towed behind a lawn tractor as well as lawn sweepers that are pushed by a user. Many of these prior lawn sweepers rely on rotation of a wheel of the lawn sweeper to drive the brush of the sweeper.

These wheel-driven units are not consistent in brush rotational speed due to the direct dependence of the brush speed on the wheel speed. When the lawn sweeper is moved slowly, the brush spins slowly; when the lawn sweeper moves faster, the brush spins faster. When thick grass or leaves are attempted to be swept up, a natural inclination of the user is to slow the ground speed of the tractor towing the lawn sweeper. Because the speed of the brush is proportional to the speed of the wheel, slowing down the ground speed of the lawn sweeper causes the brush to slow down which may cause the sweeper to become clogged. The operator therefore has to decide between speeding up for brush power or slowing down for precision and safety. It is counterintuitive to increase the ground speed of the lawn tractor as the lawn sweeper enters tall grass or wet leaves.

Another problem with wheel driven units is that a gear-up ratio is used to rotate the brush at a higher speed, but the gear-up ratio provides little torque to the brush when the lawn sweeper is being towed or pushed slowly. Because a smaller amount of torque is being applied to the brush, the brush propels the swept-up materials a shorter distance into a catch basket of the lawn sweeper. This front-loads swept-up materials into the basket and may cause uneven loading of the material within the basket.

Some prior lawn sweepers also have issues relating to changes in the height of the brush during operation of the lawn sweeper. For example, the brush height of these prior lawn sweepers may have to be adjusted when the lawn sweepers are connected to lawn tractors having different trailer hitch heights. Another problem with some prior lawn sweepers is that uneven terrain can cause the brush of the lawn sweeper to be too high off the lawn to sweep up material or can cause the brush to be too close to the lawn and dig into the lawn as the lawn sweeper is towed by the lawn tractor. Specifically, the lawn tractor towing the lawn tractor travels upwardly and downwardly over the uneven terrain before the lawn tractor does which causes the tongue of the lawn sweeper to raise and lower. The raising and lowering of the lawn sweeper tongue generally causes the sweeper head of the lawn sweeper to tilt about the wheels of the lawn sweeper which causes the brush to be too high off of the lawn or causes the brush to be too close to the lawn. Similar problems have been encountered with walk-behind lawn sweepers as a user pushes the lawn sweeper over hilly terrain. Because the user continues to hold the handle of the sweeper, the sweeper head of the lawn sweeper may tilt about the wheels and cause the brush to be too high off of the lawn to sweep up material or to be too close to the lawn and dig into the lawn.

SUMMARY

In accordance with one aspect of the present invention, a lawn sweeper is provided for being towed by a lawn tractor and removing material from a surface along which the lawn tractor is driven. The lawn sweeper has a body with a tongue for being connected to the lawn tractor, at least one wheel connected to the body for rolling along the surface, and a rotatable brush mounted to the body for removing material from the surface. The lawn sweeper has a motor mounted to the body for rotating the brush independently of the rotation of the at least one wheel. As used herein, the term "independently" is used to refer to the ability of the motor to rotate the brush without rotation of the brush being influenced or controlled by the rotation of the at least one wheel. The lawn sweeper further includes a remote control for being operatively coupled to the motor and manipulated by a user on the lawn tractor to control the motor. The remote control and motor permit a user on the lawn tractor to selectively operate the rotatable brush to remove material from the surface while the user remains seated on the lawn tractor. This offers the user improved precision to sweep desired areas of a lawn, driveway, etc. by operating the brush only at desired sweep areas rather than rotating the brush at all times when the lawn sweeper is moving as in some prior wheel-driven lawn sweeper units. Further, the user may continuously drive the lawn tractor and selectively operate the brush at a plurality of sweep areas without having to dismount from the lawn tractor and adjust the lawn sweeper.

Another advantage of the lawn sweeper is that the motor drives the brush independently of the rotation of the at least one wheel which permits the operation of the brush to be optimized. For example, the motor may continuously rotate the brush at speeds in the range of approximately 600 rotations per minute (RPMs) to approximately 1000 RPMs even when the tractor or user slows down such as to maneuver around landscaping. By optimizing the speed of the brush throughout a sweeping operation, the brush can consistently propel swept-up material to a back of a container carried by the body and evenly load the container during the sweeping operation, which maximizes utilization of the container space.

In one form, the motor is an electric motor and the lawn sweeper includes an electrical connector for connecting the electric motor to an electrical system of the lawn tractor and powering the motor. This approach stands in contrast to some prior lawn sweepers that rely on rotation of an accessory drive of a lawn tractor to rotate the brush. These prior lawn sweepers have a complicated transmission including belts and pulleys to transmit the rotation of the accessory drive to the brush. This transmission complicates the connection between the lawn tractor and the prior lawn sweeper and may be susceptible to environmental factors which could degrade operation of the transmission.

The lawn sweeper disclosed herein may have an improved, durable transmission with a gear belt or chain operably connecting the motor and the brush. The motor and brush may have pulleys with teeth that mate with gear teeth of the gear belt. The interlocking engagement between the teeth of the gear belt and pulleys resists slipping between the gear belt and pulleys due to environmental factors, such as moisture and oil. In another approach, a chain operably couples the motor drive shaft and the brush. The drive shaft and brush have associated sprockets for engaging the chain. The interlocking engagement between links of the chain and the sprockets resist slippage therebetween and provide improved durability of the transmission.

In accordance with another aspect, a lawn sweeper is provided having a pair of wheels, a body shiftable between raised and lowered positions relative to the wheels, and a brush rotatably mounted to the body. A basket is supported by the body for receiving material swept up by the brush. The lawn sweeper includes a support having the wheels mounted thereto with the support being pivotally connected to the body at a fixed location of the body. Because the wheels are mounted to the support and the pivot connection between the body and the support is at a fixed location of the body, pivoting of the support generally about the wheels urges the pivot connection upwardly and downwardly which raises and lowers the body relative to the wheels. The support may include a handle that a user can readily grasp and use to pivot the support about the wheels and raise and lower the body and brush mounted thereto.

In one form, the fixed location of the body includes a pair of fixed locations of the body and the support includes a pair of arm portions pivotally connected to the body at the fixed locations and a cross member connecting the arm portions to pivot the arm portions together relative to the body. An adjustable linkage connects the cross member to the body for selectively inhibiting pivoting of the arm portions relative to the body and setting the height of the brush. Due to the fixed pivot connections between the support pivot arms and the body, the weight of the motor, brush, basket, and other components is transmitted to the wheels via the support arm portions which may be made of sufficiently rigid material, such as steel. This configuration advantageously puts the weight of the components on the support arm portions rather than on the adjustable linkage. In some prior lawn sweepers, the entire weight of the brush, frame, and basket was carried by a friction lock between a flat iron connected to the sweeper head and a handle connected to the wheels. Impacts from the wheels of these prior lawn sweepers traveling over rocks, roots, or other bumpy terrain have been discovered to cause disengagement of the friction lock and unintended adjustment to the height of the sweeper head of these prior lawn sweepers. By contrast, the fixed pivot connections between the support pivot arms and the body of the lawn sweeper transfer impacts from the wheels traveling over rough terrain to the body rather than entirely through a friction lock. The lawn sweeper thereby provides a more durable height adjustment mechanism than some prior lawn sweepers.

A lawn sweeper in also provided for removing material from a surface. The lawn sweeper has a pair of wheels rotatable about a common wheel axis, a body shiftable between raised and lowered positions relative to the wheels, and a brush mounted to the body and rotatable about a brush axis. The brush axis is substantially vertically aligned with the wheel axis with the body in the raised position and the lowered position. As used herein, the term "substantially vertically aligned" refers to the position of the brush axis in fore and aft directions as measured from a vertical plane intersecting the wheel axis with the brush axis being within a predetermined distance from the vertical plane when the body is in the raised and lowered positions.

The lawn sweeper has a height adjustment mechanism connecting the body to the wheels for shifting the body between the raised and lowered positions relative to the wheels. Because the brush axis is substantially vertically aligned with the wheel axis when the body is in the raised position and the lowered position, changes to the orientation of the body such as the lawn sweeper traveling over uneven terrain produces a minimized change in the height of the brush above the ground. More specifically, it has been discovered that the problem of the brushes of some prior lawn sweepers jumping up too high off of a lawn or digging into the lawn is due to the brushes of these prior lawn sweepers being significantly forward of the axis of rotation of the wheels. Stated differently, the frames of these prior lawn sweepers act as levers and the wheels of the sweepers act as fulcrums for the levers. As one of these prior lawn sweepers travels over uneven terrain or is connected to lawn tractors with hitches of different heights, the frame of the prior lawn sweeper tilts about the wheels. The brush of the prior lawn sweeper, which is significantly forward of the wheels along the frame, moves with the frame as the frame tilts about the wheels and jumps up too high or shifts too low and digs into the lawn. The subject lawn sweeper addresses this issue by maintaining the axis of rotation of the brush in substantial vertical alignment with the axis of rotation of the wheels. In this manner, tilting of the body about the wheels, such as by traveling over hilly terrain or connecting the body to trailer hitches of different heights, produces a marginal amount of up and down movement of the brush and thereby reduces the likelihood of the brush jumping up too high or digging into the lawn.

In one form, the brush axis is above the wheel axis with the body in the raised position and the brush axis is below the wheel axis with the body in the lowered position. By permitting the brush axis to travel below the wheel axis with the body in the lowered position, the height adjustment mechanism can compensate for wear on the brush and associated decrease in its diameter by permitting the user to position the brush progressively closer to the lawn as the brush wears.

In accordance with another aspect of the present invention, a sweeper for removing material from a surface is provided. The sweeper has a body, a pair of wheels connected to the body, and a brush rotatable relative to the body for removing material from the surface with rotation of the brush. The sweeper has a container for receiving material removed from the surface by the brush and being pivotally supported by the body. The sweeper also has a flexible elongate actuator for pivoting the container with a handle end portion for being pulled. The elongate actuator also includes an anchor end portion fixed to the body and spaced from the handle end portion along the elongate actuator. An intermediate portion of the elongate actuator is intermediate the handle end portion and the anchor end portion and is connected to the container. When the handle end portion is pulled, the anchor end portion remains affixed to the frame while the intermediate portion pulls the container upwardly away from the brush toward a discharge orientation. The connection between the intermediate portion of the elongate actuator and the container provides a mechanical advantage for the user to dump swept materials from the container.

In one form, the connection between the intermediate portion of the elongate actuator and the container includes a first pulley. The first pulley permits the user to pivot the container with greater force than is applied to the handle end portion of the elongate actuator. The sweeper may also include a second pulley mounted to the body for engaging the intermediate portion of the elongate actuator and providing further mechanical advantage for pivoting the container. The first and second pulleys together route the elongate actuator along a predetermined path and ensure smooth application of the pulling force to the container.

BRIEF DESCRIPTION OF THE DRAWINGS

FIG. 3 is a bottom plan view of a front end of the lawn sweeper of FIG. 1 showing a housing and a support pivotally connected to the housing with the support having a wheel mounted thereto;

FIG. 4 is a schematic view of the housing of the lawn sweeper of FIG. 1 in a raised position;

FIG. 5 is a schematic view similar to FIG. 4 showing the housing in a lowered position;

DETAILED DESCRIPTION OF THE PREFERRED EMBODIMENTS

Figure 1:
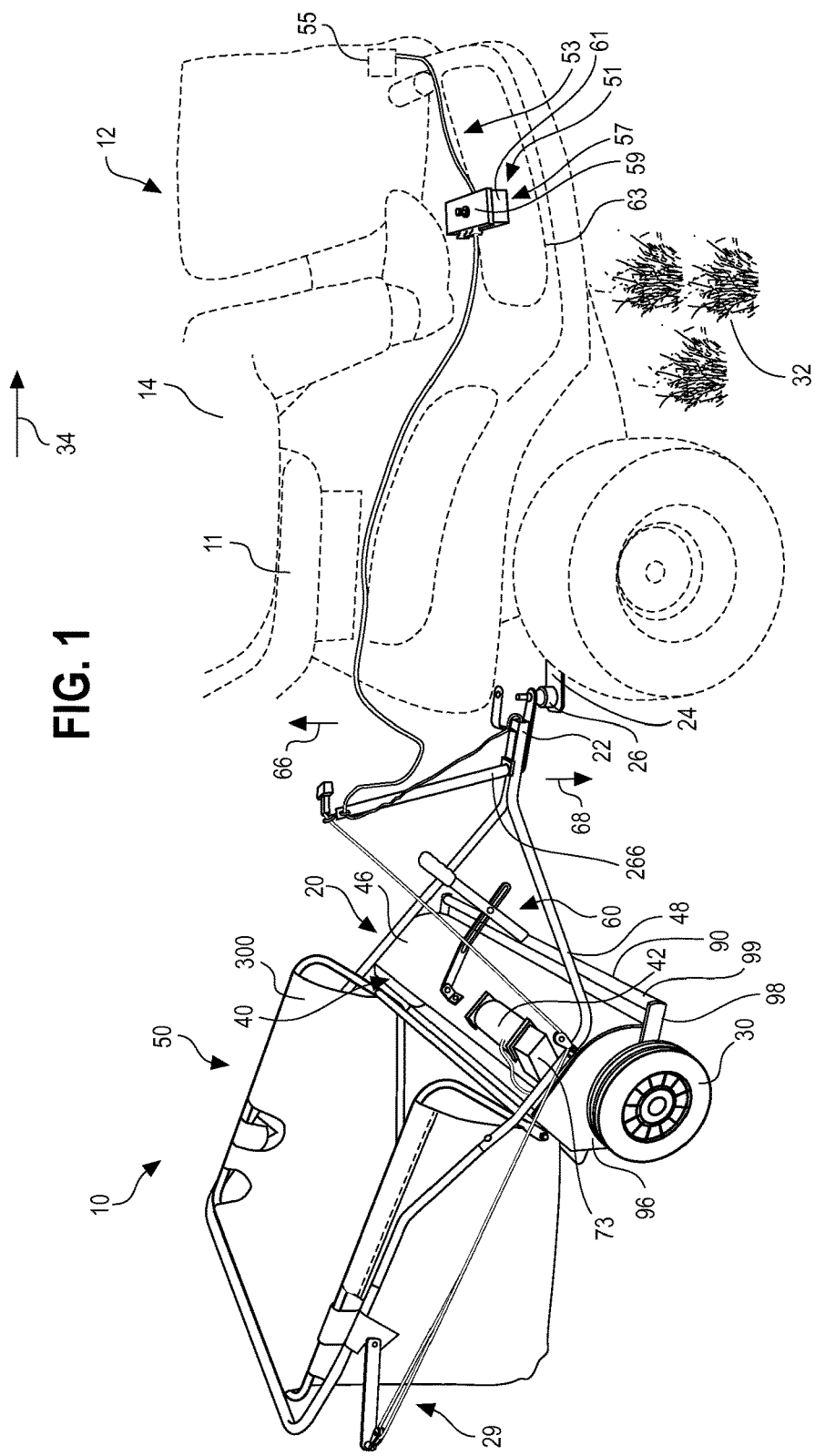
FIG. 1 is a perspective view of a lawn sweeper coupled to a lawn tractor.

With reference to FIG. 1, a lawn sweeper 10 is provided that may, in one form, be towed behind a vehicle, such as a tractor 12, and operated by a user 14 riding on a seat 11 of the tractor 12. The lawn sweeper 10 has a body 20 with a tongue 22 for connecting to a hitch plate 24 of the tractor 12, such as by a coupling device 26. The body 20 is connected to wheels 30 that roll along a surface 32 as the lawn tractor tows the lawn sweeper 10 in direction 34. The lawn sweeper 10 includes a brush 40 and a motor 42 for rotating the brush 40 independently of rotation of the wheels 30. The body 20 includes a housing 46 for the brush 40 and a frame 48 that supports the housing 46 as well as a container, such as a basket 50, for receiving material swept up by the brush 40. The lawn sweeper 10 includes a remote control 51 that permits the user 14 riding on the seat 11 of the tractor 12 to selectively operate the motor 42 and rotate the brush 40 without having to dismount from the tractor 12. Because the motor 42 operates the brush 40 independently of the wheels 30, the motor 42 may drive the brush 40 at a brush speed that is higher than some prior wheel-driven lawn sweepers. For example, the motor 42 may rotate the brush 40 at a speed in the range of 600 to 1000 rotations per minute (RPM), such as approximately 900 RPM. For a ten-inch diameter brush, a rotational speed of 900 RPM produces a sweeping action of approximately 2,356 surface feet per minute. A prior lawn sweeper having a wheel-driven, ten-inch diameter brush would have to be traveling at a high speed in order to achieve this sweeping action, but the lawn sweeper 10 can provide this sweeping action at slow forward speeds, e.g., less than one mile per hour when performing high accuracy sweeping, or even operating in reverse. The motor 42 may also be used to rotate the brush 40 at varying speeds as desired for a particular application, such as at speeds that increase as the lawn sweeper encounters heavier or deeper material.

The lawn sweeper 10 has height adjustment mechanism 60 for adjusting the height of the brush 40 above the surface 32 that maintains an axis of rotation 62 (see FIGS. 4 and 5) of the brush 40 substantially vertically aligned with an axis of rotation 64 of the wheels 30. Due to the substantially vertical alignment of the axes 62, 64, vertical movement of the tongue 22, such as due to the lawn tractor 10 and lawn sweeper 12 traveling over hilly terrain or connecting the tongue 22 to hitch plates 24 of different tractors, produces very little if any vertical movement of the brush axis 62 relative to the surface 32. Stated differently, the height adjustment mechanism 60 maintains the brush and wheel axes 62, 64 substantially vertically aligned and minimizes changes to the vertical position of the brush axis 64 due to movement of the tongue 62 in directions 66, 68. In one form, it has been found that movement of the tongue 22 in direction 66 (see FIG. 1) from a level orientation upward one and half feet produces a variation of only approximately 0.01 inches in the vertical position of the brush axis 62. This limited vertical variation keeps the brush 40 from digging into the lawn or lifting out of contact with the grass as the tractor 12 and lawn sweeper 10 travel over hilly terrain, for example.

With reference to FIG. 1, the motor 42 may have a variety of different forms including an electric motor, an internal combustion motor, and a hydraulic motor. The motor 42 may be powered by a number of different sources. For example, the motor 42 may be an electric motor 42 and the lawn sweeper 10 includes an electrical connector 53 coupling the electric motor 42 to an electrical system 55 of the tractor 12. As one example, the electrical connector 53 may include one or more insulated electrical cords that have alligator clips at one end of the cords for engaging terminals of a battery of the tractor 12 and connecting the connector 53 to the electrical system 55. The one or more cords may extend backward from the tractor 12 to a riser 266 of the frame 48, are fed through an interior of the frame 48, and exit the frame 48 near the motor 42 and are connected thereto. This reduces the risk of the electrical connector 53 being caught or damaged such as by a branch of a bush.

The remote control 51 may have a variety of forms including wired and wireless embodiments. For example, the remote control 51 may include a switch 57 of the electrical connector 53. The switch 57 has a user interface, such as a button 59, which the user can operate while on the seat 11. In one form, the switch 57 has a base portion 61 mounted to a foot rest 63 of the tractor 12. The switch 57 is a two-position switch and the user 14 can step on the button 59 to activate the motor 42 and step on the button 59 again to deactivate the motor 42. This permits hands-free operation of the motor 42 and brush 40 and permits the user 14 to selectively rotate the brush 40 without having to stop and dismount from the tractor 12.

Figure 2:
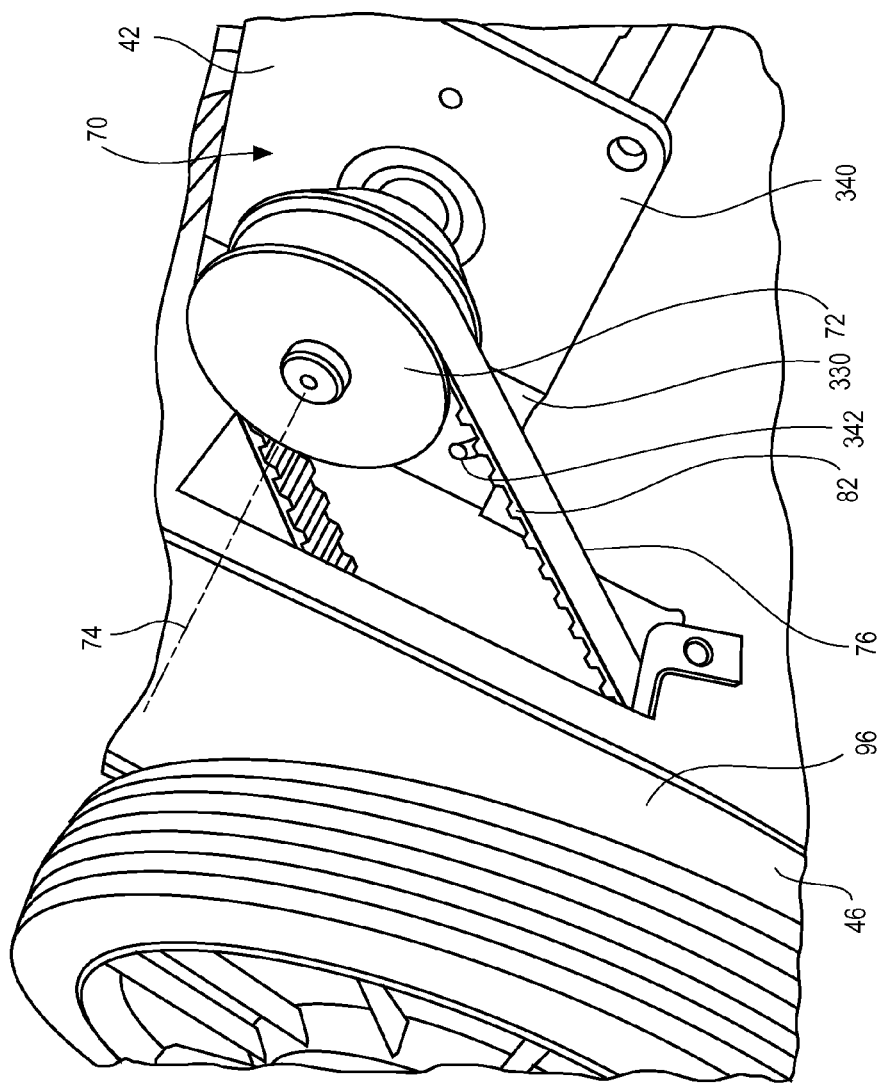
FIG. 2 is a perspective view of a motor of the lawn sweeper of FIG. 1 with a cover of the lawn sweeper removed to show a belt connected to the motor for rotating a brush of the lawn sweeper.

With reference to FIG. 2, the motor 42 has a drive shaft 70 with a drive pulley 72 that is rotatable about a drive axis 74 which extends substantially parallel to the brush axis 62. The motor 42 drives the brush 40 via a flexible drive member such as a gear belt 76, although other transmissions are contemplated such as series of gears. The gear belt 76 is connected at one end to the drive pulley 72 of the motor 42 and is connected at an opposite end to a pulley 80 of the brush 40, as shown in FIG. 3. The drive pulley 72 and the brush pulley 80 may have a ratio of the effective diameter of the brush pulley 80 to the effective diameter of the drive pulley 72 in the range of approximately 2:1 to approximately 5:1, such as approximately 3:1. The gear belt 76 has teeth 82 that intermesh with teeth 84 of the pulleys 72, 80 and resist slipping of the gear belt 76 relative to the pulleys 72, 80. This engagement permits the motor 42 to drive the brush 40 with minimal slipping therebetween even when moisture, oil, or both are present on the gear belt 76. The lawn sweeper 12 thereby has a weather and wear-resistant transmission for the motor 42 to drive the brush 40 independently of rotation of the wheels 30. In another form, the drive shaft 70 includes a drive sprocket and the brush 40 includes a follower sprocket connected to the drive sprocket by a chain. The links of the chain engage teeth of the drive and follower sprockets and provide a similar resistance to slipping between the chain and sprockets and provide a durable transmission for the lawn sweeper 10. In one form, the housing 46 includes a cover portion 73 (see FIG. 1) for partially or entirely enclosing the pulleys 72, 80 and the gear belt 76. The cover portion 73 is shown removed in FIG. 2 to show the connection between the drive pulley 72 and the gear belt 76.

With reference to FIGS. 1 and 3, the height adjustment mechanism 60 includes a support 90 having a pivot connection 92 with the housing 46 at a fixed location 93 of the housing 46. As discussed in greater detail below, a user pivots the support 90 relative to the housing 46 about a pivot axis 110 to shift the housing 46 and brush 40 therein between raised and lowered positions. The fixed location 93, and the pivot axis 110, remain at the same position on the housing 46 as the support 90 pivots to raise and lower the housing 46 and brush 40.

In one form, the housing 46 has lateral walls 96 at opposite ends of the brush 40 and the support 90 has arm portions 98 connected to each of the lateral walls 96. The pivot connection 92 includes a pin 100 extending through openings 102, 104 in each arm portion 98 and the associated housing lateral wall 96. Generally speaking, the pins 100 permit the arm portions 98 to pivot about the pivot axis 110 in directions 204, 208 relative to the housing 46 (see FIGS. 4 and 5) and the wheels 30 permit the support 90 to pivot about the wheel axis 64 as the housing 46 shifts between raised and lowered positions. The pins 100 may include hardware, such as washers, bushings, etc. to provide a secure connection between the arm portions 98 and the housing lateral walls 96 while permitting pivoting of the arm portions 98 about the pivot axis 110 relative to the housing 46.

With reference to FIG. 3, the arm portions 98 of the support 90 include wheel portions 112 to which the wheels 30 are mounted such as by a bolt extending through an opening of the wheel portion 112. The arm portion 98 separates the axis of rotation 64 of the wheels 30 from the pivot axis 110 by a distance 114. The housing 46 includes one or more inner walls 120 that support bushings 122, which in turn permit rotation of the brush 40. The bushings 122 can be connected to the wall 120 in a variety of ways, such as openings in the walls 120 that receive the bushings 122 and hardware and/or welds that secure the bushings 122 within the openings. The one or more walls 120 and bushings 122 maintain the brush 40 at a predetermined position in the housing 46 while permitting rotation of the brush 40 in direction 220 (see FIG. 4) within the housing 46. Ball bearings may also be used to rotatably support the brush 40 at the predetermined position in the housing 46.

As shown in FIG. 3, the pins 100 are at the fixed locations 93 along the housing lateral walls 96 such that the location of the pivot axis 110 defined by the pins 100 is fixed relative to the housing 46 whether the housing 46 and brush 40 are in the raised position or the lowered position. The one or more inner walls 120 support the brush 40 at a distance 130 from the pivot axis 110 with the distance 130 being fixed since the brush 40 is mounted to the one or more inner walls 120 of the housing 46 as discussed above. Similarly, the support 90 and arm portions 98 thereof are made of a rigid material, such as steel, and separate the wheel axis 64 from the pivot axis 110 by a distance 114. In one form, the distances 114, 130 are substantially the same such that the wheel axis 64 and the brush axis 62 travel along a common arc 200 as the housing 46 and brush 40 are shifted between raised and lowered positions, as shown in FIGS. 4 and 5 and discussed in greater detail below. By constraining the brush and wheel axes 62, 64 to travel along a common arc 200, the height adjustment mechanism 60 permits the support 90 to operate as a jack to raise and lower the housing 46 and brush 40 while limiting the fore-aft movement of the brush axis 62 and keeping the brush axis 62 substantially vertically aligned with the wheel axis 64.

With reference to FIGS. 4 and 5, the operation of the height adjustment mechanism 60 will be discussed in greater detail. The wheels 30 rest on the surface 32 with the housing 46 a distance 141 above the surface 32 and the wheel axis 64 generally at a distance 142 above the ground as set by the diameter of the wheels 30. As discussed above, the wheels 30 are mounted on the wheel portions 112 of the arm portions 98 of the support 90. The support 90 includes a handle bar 150 and a cross bar 99 connecting the arm portions 98 and the handle bar 150. As the handle bar 150 of the support 90 is pulled backward in direction 152 or lowered forward in direction 154, the arm portions 98 pivot about the pins 100 as shown in FIGS. 4 and 5. The user is effectively lifting the housing 46 upward with pivoting of the handle bar 150 when pulling the handle bar 150 in direction 152. Conversely, the weight of the frame 48, housing 46, brush 40, motor 40, etc. pulls these components toward the surface 32 so that the user resists pivoting of the handle bar 150 in direction 154 to lower the housing 46 in a controlled manner.

Because the wheels 30 are rotatably connected to the wheel portions 112 of the arm portions 98, the arm portions 98 generally pivot about the wheel axis 64 as the handle bar 150 is moved in directions 152, 154 and the pins 100 transfer this pivoting movement of the arm portions 98 about the wheel axis 64 into raising or lowering of the housing 46. The handle bar 150 has a height adjustment handle 156 that may have a rubber grip with a scalloped profile or other configuration to increase the ease with which a user may grasp and pull or lower the adjustment handle 156, pivot the support 90, and raise or lower the housing 46 and the brush 40.

The height adjustment mechanism 60 further includes a bar 160 having a slide connection 161 with the handle bar 150 and a pivot connection to the housing 46 at a bracket 162, as shown in FIG. 4. The bar 160 can slide relative to the handle bar 150 and pivot relative to the housing 46 to provide controlled raising and lowering of the housing 46. The height adjustment mechanism 60 has a height position lock 166 for fixing the slide connection 161 and the relative orientations of the handle bar 150 and the bar 160. The height position lock 166 may include structures in the bar 160, such as an elongated slot 170 with notches 178, and a pin 174 that extends through an opening in the handle bar 150 and through the slot 170. The pin 174 is sized to rest in one of the notches 178 that corresponds to a particular height of the brush axis 62 above the surface 32. The pin 174 may have a knob on one side of the bar 160, a threaded shank extending through the slot 170 of the bar 160 and through the hole in the handle bar 150, and a nut threaded onto the shank on an opposite side of the handle bar 150. Tightening the knob and/or the nut compresses and frictionally engages the bar 160 and the handle bar 150 together and inhibits relative movement therebetween. This sets the housing 46 and brush 40 in the desired vertical position because the secured handle bar 150 and bar 160 resist pivoting of the support 90 about the pins 100. Further, the engagement of the pin 174 in the notch 170 provides additional resistance to sliding at the connection 161 between the handle bar 150 and the bar 160 and resists unintentional raising or lowering of the housing 46 and the brush 40.

With reference to FIG. 4, the housing 46 is connected to the support 90 at the pins 100. The weight of the frame 48, housing 46, motor 42, brush 40, basket 50, and contents of the basket 50 act primarily in direction 182 on the pins 100, which transmit this loading to the support arm portions 98, which in turn transmit the loading to the wheels 30. By carrying the weight of the frame 48, housing 46, motor 42, brush 40, basket 50, and swept material in the basket 50 on the pins 100, jarring movements such as the lawn sweeper 10 going over bumps or rocks are transmitted to the arm portions 98 which are sufficiently rigid to resist the loading. Additionally, the majority of the forces from these jarring movements are transmitted to the pins 100 rather than the pin 174 connecting the handle bar 150 and the bar 160. This reduces the likelihood of the pin 174 being forced out of engagement with one of the notches 178, permitting the arm portions 98 to pivot about the pins 100, and thereby unintentionally changing the height of the brush axis 62.

As discussed above, the distance 114 between the pivot axis 110 and the wheel axis 64 and the distance 130 between the pivot axis 110 and the brush axis 62 may be substantially the same. Because the brush axis 62 and wheel axis 64 have the same generally fixed distance from the pivot axis 110, the brush axis 62 and wheel axis 64 are constrained to travel along a common arc 200 having a radius 202 measured from the pivot axis 110 that is substantially the same as distances 114 and 130. With reference to FIG. 4, the handle bar 150 has been pulled backward in direction 152 which pivots the arm portion 98 in direction 204 and lifts the pins 100 and housing 46 connected thereto upward toward a raised position. In the raised position, the brush axis 62 is above the wheel axis 64. Further, the lawn sweeper 10 may position the brush axis 62 in the raised position so that the lowermost ends of the bristles of the brush 40 are in the range of approximately two inches to approximate four inches, such as approximately three inches, above the ground supporting the wheels 30.

With reference to FIG. 5, the knob of the pin 174 has been loosened to release the engagement between the handle bar 150 and the bar 160, which permits the user to lift upward on an end 160A of the bar 160 and disengage the notch 178 from the pin 174. With the notch 178 disengaged from the pin 174, the pin 174 can be slid fore or aft along the slot 170 and the bar 160 can pivot up and down about the bracket 162 as the pin 174 slides along the slot 170.

The handle bar 150 may be lowered in direction 154 to pivot the arm portions 98 in direction 208 about the pin 100. This pivotal movement of the arm portions 98 moves the pins 100 and housing 46 connected thereto downward to position the brush axis 62 below the wheel axis 64. By permitting the brush axis 62 to travel below the wheel axis 64, the user can progressively lower the brush 40 to compensate for wear in the brush 40 over time. As one example, the wheels 30 may have a ten inch diameter and the brush 40 may initially have a ten inch diameter. Over time, such as several years, the bristles of the brush 40 may wear down and decrease the effective diameter of the brush 40 to be eight inches. The height adjustment mechanism 60 permits the user to position the brush axis 62 below the wheel axis 64 and closer to the surface 32 so that the bristles of the brush 40 can still be positioned at a predetermined position relative to the surface 32, such as extending into grass approximately 0.75 inches, and compensate for the decreased diameter of the brush 40. In the lowered position, the lawn sweeper 10 may position the brush axis 62 so that the lowermost ends of the bristles of the brush 40 are in the range of approximately 0.5 to approximately 1.5 inches below the ground supporting the wheels 30, to permit a user to compensate for wear on the brush 40 over time.

As shown in FIGS. 4 and 5, the brush axis 62 and the wheel axis 64 are substantially vertically aligned when the housing 46 is in the raised position and when the housing 46 is in the lowered position. By substantially vertically aligned it is intended to mean that the brush axis 64 is within a predetermined distance 212 in the fore or aft direction from a vertical plane 213 extending through the wheel axis 62 when the housing 46 is in the raised or lowered position. In one form, the distance 212 may be less than approximately 1.5 inches, less than approximately 1 inch, less than approximately 0.75 inches, less than approximately 0.5 inches, and less than approximately 0.25 inches. It will be appreciated that the brush axis 62 can be on different sides of the plane 213 although the brush axis 62 remains within the predetermined range of the plane 213. For example, the brush axis 62 may be aft (to the right in FIGS. 4 and 5) of the plane 213 with the housing 46 in the raised position and the brush axis 62 may be forward (to the left in FIGS. 4 and 5) of the plane 213 with the housing 46 in the lowered position.

By minimizing the distance 212 in the fore and aft directions the brush axis 62 travels relative to the wheel axis 64 with raising and lowering of the housing 46, the effect of raising and lowering the tongue 22 in directions 66, 68 (see FIG. 1) on the height of the brush axis 62 from the ground 140 is minimized. By contrast, some prior lawn sweepers position the axis of rotation of their brush relatively far forward from the axis rotation of the wheels of the lawn sweeper. Due to the relatively far forward displacement of the brush axis, raising and lowering of the tongue of one of these prior lawn sweepers produces a proportional raising and lowering of the brush axis relative to the ground. This raising and lowering of the brush axis is undesirable in many instances because if the brush axis rises the rotating brush may miss leaves or other debris and if the rotating brush lowers the brush may bite into the lawn. Thus, the height adjustment mechanism 60 offers an improved operation by minimizing the change in the height of the brush axis 62 in response to changes of the height of the tongue 22 such as due to movement of the lawn sweeper 10 over hilly terrain or connecting the tongue 22 to hitch plates 24 of varying heights.

With reference to FIG. 4, a method of lowering and raising the housing 46 and brush 40 will be described. Initially, the housing 46 is in a raised position as shown in FIG. 4. To lower the housing 46 and the brush 40, the user first releases the height position lock 166 to release the engagement of the handle bar 150 and the bar 160. The user may lift upward slightly on the end 160A of the bar 160 to disengage the notch 178 from the pin 174 or may pull the adjustment handle 156 in direction 154 to snap the pin 174 out of the notch 178.

After disengaging the pin 174 and notch 178, the user grasps the height adjustment handle 156 and lowers the height adjustment handle 156 in direction 154 permitting the weight of the motor 42, housing 46, frame 48, basket 50, etc. to weigh on the pins 100 and cause the pins 100 to pivot the support arm portions 98 generally about the wheel axis 64. As the support arm portions 98 pivot about the wheel axis 64, the arm portions 98 also pivot relative to the housing 46 about the pivot axis 110. The pin 174 travels forwardly in the slot 170 and the brush axis 62 travels downwardly along the arc 200.

The user continues to grasp the height adjustment handle 156 and permit the weight of the motor 42, housing 46, frame 48, basket 50, etc. to urge the pins 100 downwardly and pivot the arm portions 98 about the wheel axis 64 until the housing 46 and brush 40 reach the desired vertical position. As shown in FIG. 5, the desired vertical position is a lower position where the brush axis 62 has traveled along the arc 200 downward beyond the wheel axis 64. Because the brush axis 62 and wheel axis 64 lie along a common radius, there is a point between the raised position (see FIG. 4) and the lowered position (see FIG. 5) where the axes 62, 64 are coaxial.

Once the housing 46 has reached the desired lowered position, a forward one of the notches 178 of the slot 170 fits onto the pin 174 which temporarily holds the housing 46 in the vertical position. Next, the knob and/or the nut of the pin 174 is tightened to press the handle bar 150 against the bar 160 and clamp the bars 150, 160 together between the knob and the nut of the pin 174. With the pin 174 engaged in the forward notch 178 and the knob and nut of the pin 174 clamping the handle bar 150 against the bar 160, the secured connection between the handle bar 150 and the bar 160 resists pivoting of the arm portions 98 of the support about the pivot axis 110. In this manner, the support 90 and arm portions 98 thereof are maintained at a rotational position relative to the housing 46 to hold the housing 46 at the desired height 141A.

To shift the housing 46 from the lowered position to the raised position, the process is reversed. For example, the knob and/or the nut of the pin 174 is loosened and the user lifts upward on the end 160A of the bar 160 to disengage the forward notch 178 from the pin 174. The user then pulls the height adjustment handle 156 backward in direction 152 which generally pivots the arm portions 98 of the support 90 about the wheel axis 64. As the arm portions 98 pivot about the wheel axis 64, the pins 100 lift the housing 46 and brush 40 upward. This shifts the brush axis 62 upward along the arc 200 and above the wheel axis 64. Once the housing 46 has reached the desired height 141, the user may press downward on the end 160A of the bar 160 to engage one of the rearward notches 178 of the bar 160 onto the pin 174 or may permit the weight of the bar 160 to fit the notch 178 onto the pin 174. The user then tightens the knob and/or nut of the pin 174 to clamp the handle bar 150 and bar 160 together between the knob and the nut of the pins 174 to fix the slide connection 161 and resist pivotal movement of the arm portions 98 about the pins 100.

With reference to FIGS. 4 and 5, the wheels 30 are rotatably mounted to the wheel portions 112 of the arm portions 98 of the support 90. With the tongue 22 connected to the lawn tractor 12, movement of the height adjustment handle 156 in directions 152, 154 and associated pivoting of the arm portions 98 about pins 100 may cause the wheels 30 to roll a short distance in the fore/aft directions relative to the surface 32. Similarly, the brush axis 62 may move a short distance in the fore/aft directions relative to the surface 32 as the arm portions 98 pivot about the pins 100. Thus, both the brush axis 62 and the wheel axis 64 may move a short distance in the fore/aft directions relative to the surface 32 as the housing 46 shifts between the raised and lowered positions. However, because the distances 114, 130 are fixed (see FIG. 3), the relative movement of the brush and wheel axes 62, 64 are limited to positions along the arc 200 which maintains the substantial vertical alignment therebetween and keeps the brush axis 62 within the predetermined distance 212 of the wheel axis 64.

Figure 6:
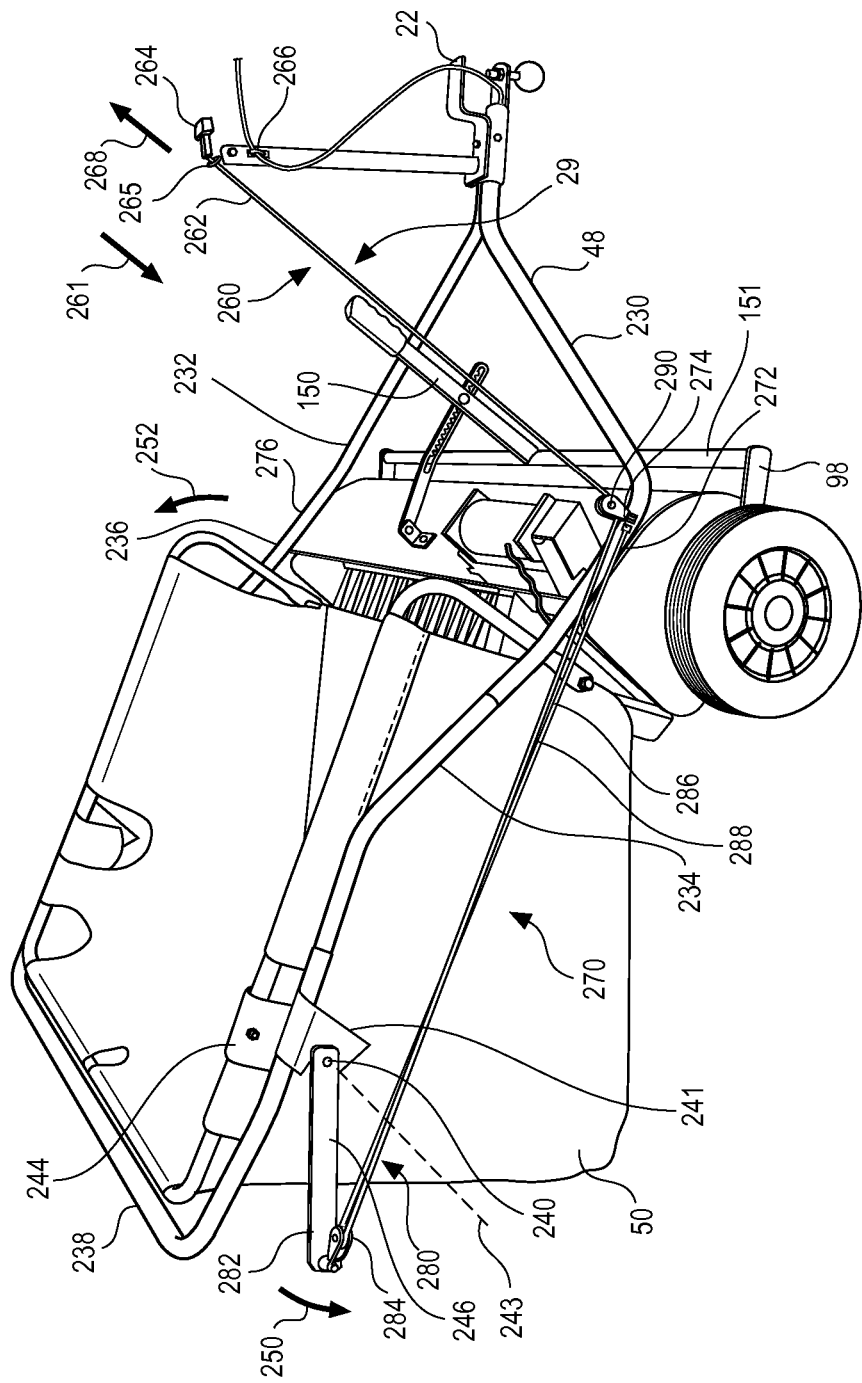
FIG. 6 is a side perspective view of the lawn sweeper of FIG. 1 showing a dump mechanism of the lawn sweeper for pivoting a basket of the lawn sweeper from an operating orientation to a dumping orientation.

With reference to FIG. 6, the dump mechanism 29 for pivoting the basket 50 from the operating orientation to the dumping orientation is discussed in greater detail. The frame 48 has lower right and lower left sections 230, 232 extending backward from the tongue 22 that connect to upper right and upper left side sections 234, 236. The upper left and right sections 234, 236 extend backward and are connected by a handle section 238. The upper right and upper left sections 234, 236 each have a bracket 241 for supporting the basket 50. In one form, the basket 50 has a pair of basket brackets 244 each having a pin 240 supported by one of the brackets 241. The pins 240 and the brackets 241 cooperate to define a dump axis 243 about which the basket 50 pivots between the operating orientation and the dumping orientation. The pin 240 associated with the upper right section 234 has a lever, such as a bar 246, extending radially outwardly therefrom and rigidly secured thereto. Thus, pivoting the bar 246 in direction 250 generates pivoting movement of the basket 50 in direction 252 about the dump axis 243.

The dump mechanism 29 includes an elongate actuator, such as a rope 260, having a handle end portion 262 with a handle 264, as shown in FIG. 6. The dump mechanism 29 includes a mechanical advantage device 270 to multiply the force applied to the handle 264 and increase the ease with which a user may pivot the basket 250 from the operating orientation toward the inverted, discharge orientation. In one approach, the mechanical advantage device 270 includes portions of the rope 260 and the bar 246 fixed to the pin 240 of the basket 50.

For example, the rope 260 may have an anchor end portion 272 secured to the lower right section 230 of the frame 48 such as by a clamp 274. The clamp 274 holds the anchor end portion 270 fixed relative to the lower right section 230. In another approach, the anchor 272 may be secured to the frame 48 by tying the anchor end portion 272 to the frame 48 or securing the anchor end portion 272 to a bolt extending through the frame 48. The rope 260 includes an intermediate portion 280 intermediate the anchor end portion 272 and the handle end portion 262 along the rope 260. The intermediate portion 280 is connected to an end 282 of the bar 246. In one approach, the connection between the intermediate portion 280 and the bar end 282 includes a pulley 284. The intermediate portion 280 has a first length 286 of the rope 260 extending from the anchor end portion 272 to the pulley 284 and a second length 288 extending from the pulley 284 toward a second pulley 290. The pulley 290 is mounted to the frame to the lower right side section 230 at a connection 294 and directs the rope 260 up toward the eye 265. The two pulleys 284, 290 operate together to provide a mechanical advantage to the tension a user applies to the rope 260. Another approach is for more pulleys may be used, such as four pulleys to further increase the mechanical advantage. In another form, one or both of the pulleys 282, 290 may be replaced by an eye or other structures.

The handle end portion 262 is threaded through an eye 265 that resists the handle 264 from pulling through the eye 264 in direction 261. The eye 265 is supported at an upper end of a riser 266 which positions the handle 264 above the tongue 22. In this manner, with the tongue 22 connected to the hitch plate 24 of the tractor 12, the handle 264 is positioned near the seat 11 of the tractor so that a user may readily grasp the handle 264 and pull the handle 264 in direction 268 to operate the dump mechanism 29 and pivot the basket 50 to the inverted, discharge orientation without having to dismount from the seat 11.

Figure 8:
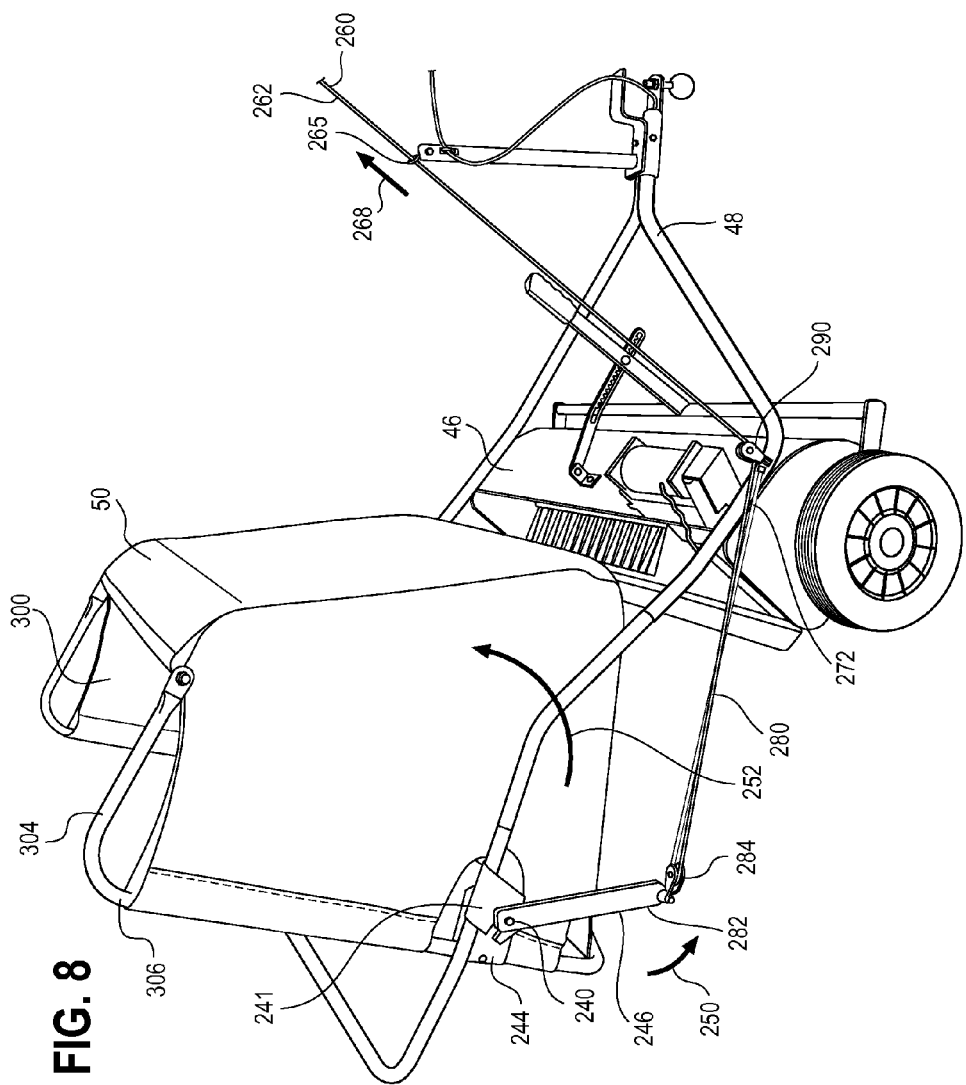
FIG. 8 is a side perspective view similar to FIG. 7 showing the opening of the basket pivoting upwardly away from the brush of the lawn sweeper.

The basket 50 includes a frame 302 with front sections 304 and upper sections 306 as shown in FIG. 8. The basket 50 further includes walls 307 supported by the frame 302 that contain the material swept up by the brush 40. The walls 307 may be made of a fabric such as mesh. In another form, the basket 50 may be molded container, such as being made from injection-molded plastic. The walls 307 could alternatively be made from cloth, canvas, nylon screen, cloth, and plastic sheeting.

Figure 7:
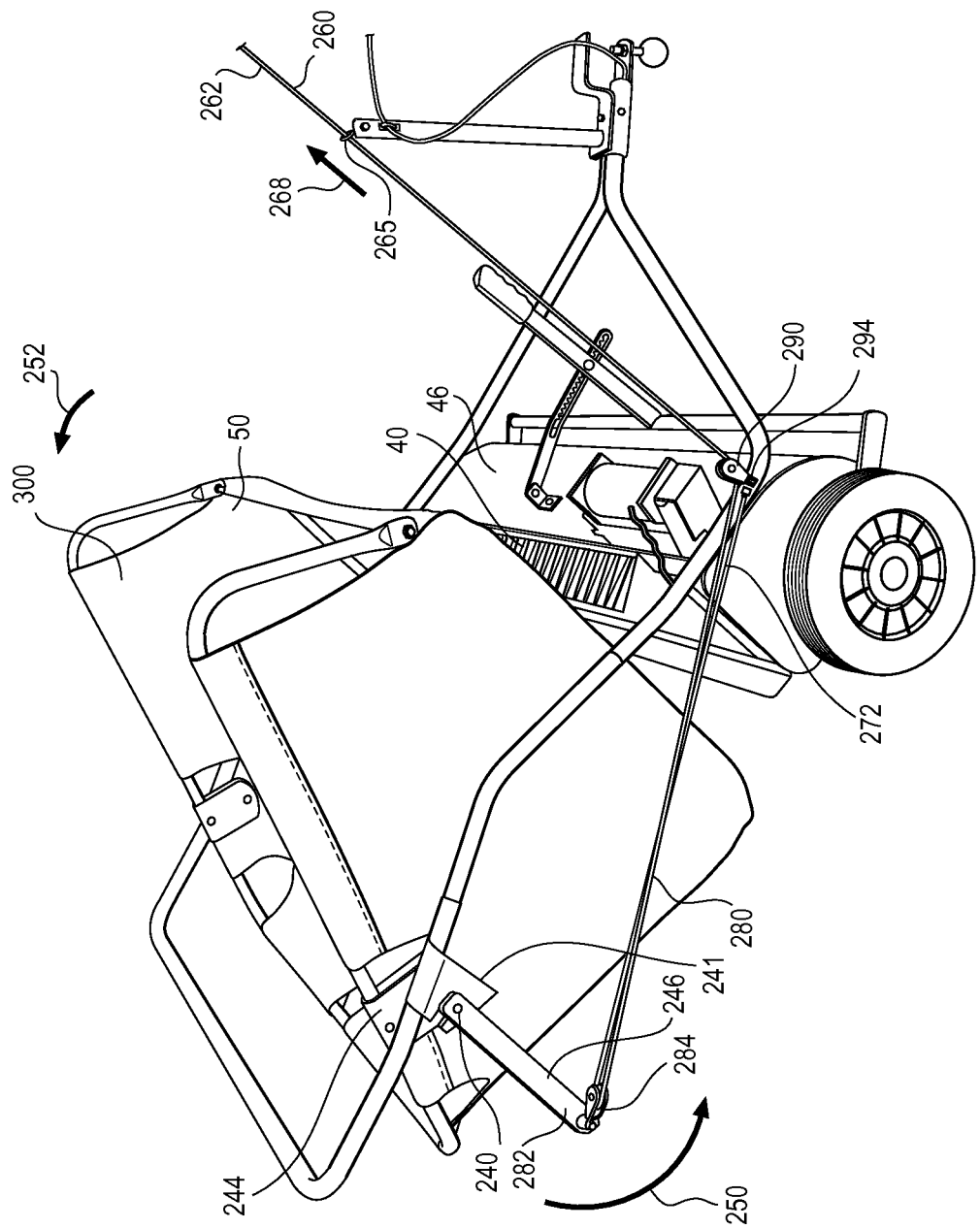
FIG. 7 is a side perspective view of the lawn sweeper of FIG. 6 showing a handle of a rope of the dump mechanism being pulled to pivot the basket.

With reference to FIGS. 6-9, a method of dumping material from the basket 50 using the dump mechanism 29 will be discussed in greater detail. Initially, the handle 264 is pulled generally in direction 268. Because the anchor end portion 272 is secured to the frame 48, the anchor end portion 272 resists the pulling force and remains stationary. However, the tension applied to the rope 260 draws rope from the second length 288 of the intermediate portion 280 through the pulley 290 and toward the eye 265. This pulls the pulley 284 toward the pulley 290 which pivots the end 282 of the bar 246 in direction 250. Due to the rigid connection between the bar 246, the pin 240, and the basket bracket 244, the pivoting movement of the bar 246 is transferred into a pivoting movement of the basket 50 and pivots the basket 50 in direction 252. As shown in FIG. 7, the basket 50 has an opening 300 positioned to receive material swept up by the brush 40. However, pulling the handle 264 in direction 268 pivots the basket 50 in direction 252 and the opening 300 upward and away from the brush 40. This is an improvement over some prior lawn sweepers that pivot their catch basket so that material in the basket falls onto the brush, which may require subsequent cleaning by an operator.

With reference to FIG. 8, continued pulling of the handle end portion 262 in direction 268 pulls rope 260 through the pulley 290 generally in direction 268. Because the anchor end portion 272 is secured to the frame 48, the length of the rope 260 between the anchor end portion 272 and the pulley 290 shortens in response to the handle end portion 262 being pulled in direction 268. This draws the pulley 284 toward the pulley 290 and, because the pulley 284 is connected to bar end 282, pivots the basket 50 in direction 252. As shown in FIG. 8, the opening 300 continues to rotate upward and away from the housing 46 and brush 40 as the handle end portion 262 is pulled in direction 268.

Figure 9:
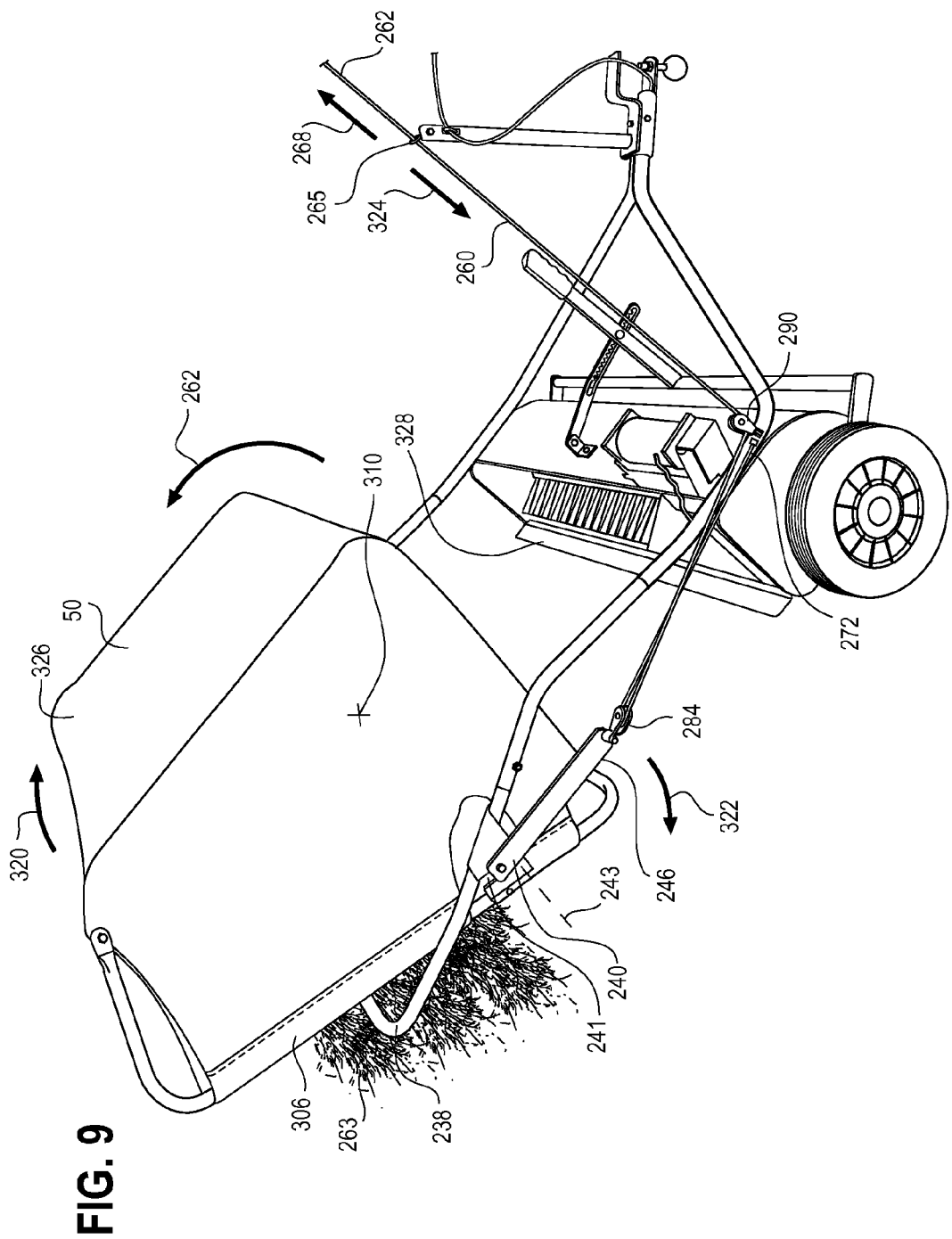
FIG. 9 is a side perspective view similar to FIG. 7 showing the basket in an inverted, dumping orientation and swept material falling out of the basket.

With reference to FIG. 9, the basket 50 pivots in direction 262 until the upper side sections 306 of the frame 302 abut against the handle section 238. The inverted orientation of the basket 50 permits swept up material 263 to fall out of the basket 50. The abutting contact of the upper side sections 306 and the handle 238 resist further pivoting of the basket 50 in direction 262. At this point, the pulling force applied to the handle end portion 262 has brought the pulley 284 closer to the pulley 290 than the pulleys were originally arranged in the operating orientation of the basket 50 (see FIG. 6). In one approach, the basket 50 is configured to have a center of gravity 310 positioned forward of the dump axis 243 defined by the cooperating pins 240 and brackets 241. By positioning the center of gravity 310 forward of the dump axis 243, the weight of the basket 50 causes the basket 250 to pivot downwardly in direction 320 back toward the operating orientation once the user has released the handle end portion 262. Thus, the basket 50 automatically returns to the operating orientation in response to the user releasing the handle end portion 262. Further, because the bar 246 is fixed to the pin 241, return pivoting of the basket 250 in direction 320 pivots the bar 246 in direction 322 and pulls the pulley 284 away from the pulley 290. This movement of the pulley 284 away from the pulley 290 draws the rope 260 generally back through the eye 265 and into the pulley 290 in direction 324. Continued pivoting of the basket 50 in direction 320 back toward its operating orientation further pivots the bar 246 in direction 322 and moves the pulley 284 farther away from the pulley 290 until the handle 264 eventually returns to its position near the eye 265 as shown in FIG. 6. In this manner, not only does the basket 250 return to its operating orientation, but the basket 50 automatically draws the handle end portion 262 back toward the eyelet 265 such that there is not a loose end of the rope 260 hanging off of the lawn sweeper 10.

With reference to FIG. 9, the frame 48 has a support member 328 that supports a front, lower portion 326 of the basket 50 once the basket 50 has pivoted back to its operating orientation. The center of gravity 310 of the basket 50 is arranged to permit the weight of the basket 50 to hold the basket lower portion 326 against the support member 328 until the user pulls the handle 264.

Figures 9A, 9B:
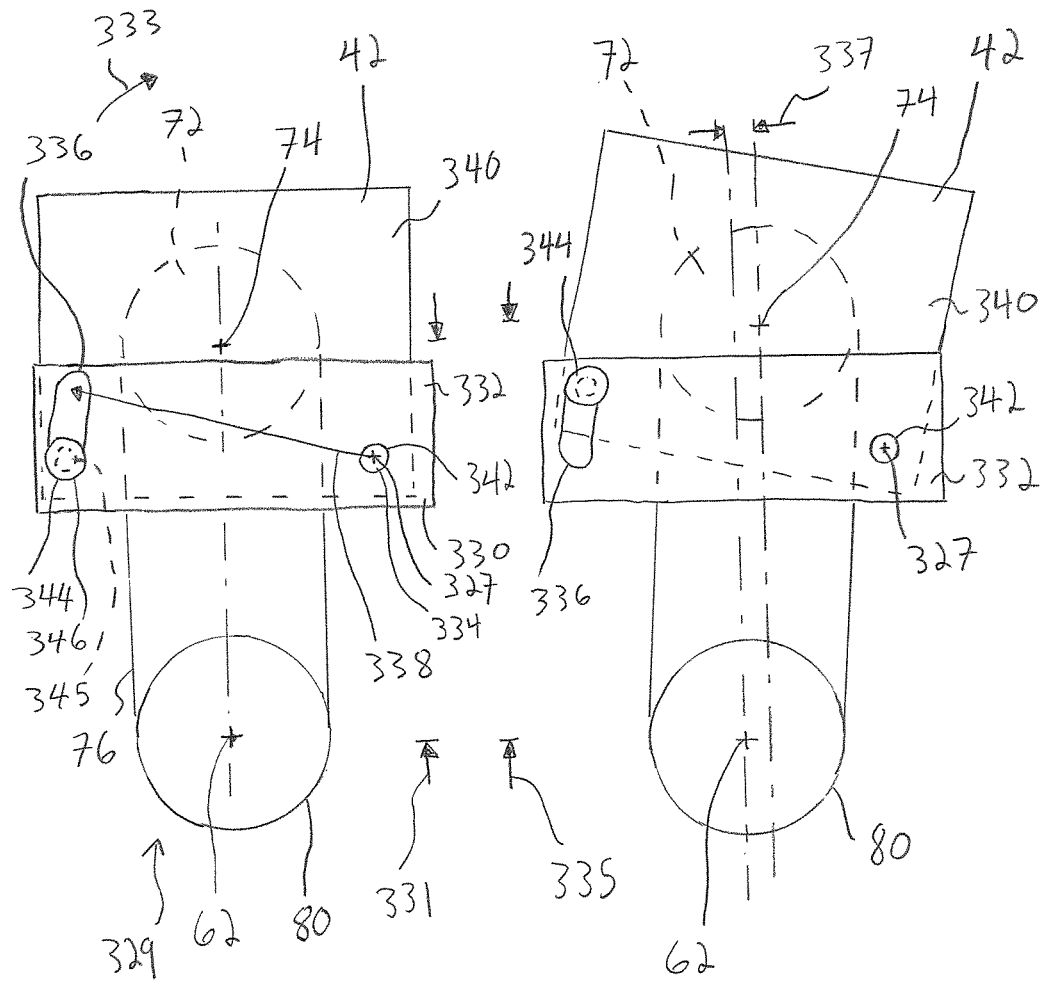
FIG. 9A is a schematic view of the motor, a motor mount, a brush pulley, and the drive belt of the lawn sweeper of FIG. 1.
FIG. 9B is a schematic view similar to FIG. 9A showing the motor pivoted to compensate for stretching of the drive belt by increasing the distance between an axis of rotation of the drive shaft and an axis of rotation of the brush.

With reference to FIG. 9A, the lawn sweeper 10 includes a motor adjustment device 329 for adjusting the position of the motor 42 to compensate for wear on the gear belt 76. The motor adjustment device 329 includes mounts 330 (see FIG. 2) at opposite ends of the motor 42 for securing the motor 42 to the housing 46. FIGS. 9A and 9B are schematic views of the mount 330 at the rear of the motor 42, i.e., at the end opposite the drive pulley 72. In one form, the mounts 330 permit pivoting of the motor 42 about a pivot axis 327 to compensate for lengthening of the gear belt 76 that may occur over time. Each mount 330 has a wall 332 with an opening 334 and an arcuate slot 336 having a radius of curvature 338 measured from the pivot axis 327. The motor 42 has end plates 340 that are each pivotally connected to one of the mounts 330 at a pin 342 extending through the opening 334. The motor end plate 340 also has a threaded opening that receives a machine screw or socket head cap screw 344 for fixing the position of the motor 42. Specifically, the screw 344 has a shank 345 that extends through the arcuate slot 336. The screw 344 has a head 346 on an opposite side of the mount wall 332 from the motor end plate 340. Tightening the screw 344 clamps the mount wall 332 between the screw head 346 and the motor end plate 340 and frictionally locks the mount wall 332 and the motor end plate 340 together.

The motor 42 may have an initial, unpivoted orientation which positions the drive axis 74 a distance 331 from the brush axis 62. When the lawn sweeper 10 is first placed into service, the gear belt 76 has a length sufficient to keep the teeth 82 of the gear belt 76 engaged with the teeth 84 of the drive pulley 72 and brush pulley 80. Over long periods of use, such as several years, the gear belt 76 may gradually stretch which reduces the engagement between the teeth 82, 84. To address this stretching, a user may loosen the screw 344 and pivot the motor 42 in direction 333 generally toward the rear of the lawn sweeper 10 and into a tensioning orientation, as shown in FIG. 9B. This causes the screw 344 to travel from a lower end of the slot 336 toward an upper end of the slot 336.

Pivoting the motor 42 in direction 333 moves the drive axis 74 longitudinally farther away from the brush axis 62 to a distance 335 that is greater than distance 331. Pivoting the motor 42 in direction 333 also moves the drive axis 74 laterally relative to the wheel axis 62 to a distance 337 offset from the wheel axis 62. This pivoting movement of drive axis 74 away from the brush axis 62 increases the distance therebetween and tightly engages the gear belt 74 with the drive pulley 72 and the brush pulley 80. Once the motor 42 has pivoted far enough in direction 333 to impart the desired tension to the gear belt 76, the user tightens the screw 344 to frictionally lock the motor 42 in the tensioning orientation relative to the bracket 332. Although pivoting the motor 42 increases the distance between the brush axis 62 and the drive axis 74, it will be appreciated that the brush axis 62, drive axis 74, and pivot axis 327 can all remain substantially parallel as the motor pivots 42 between the initial orientation and the tensioning orientation. This maintains the alignment and engagement of the gear belt 76 with the drive and brush pulleys 72, 80. In another approach, a movable idler pulley engaged with the gear belt 76 could be used to take up slack in the gear belt 76 instead of or in addition to pivoting the motor 42 to remove slack from the gear belt 76.

Figure 10:
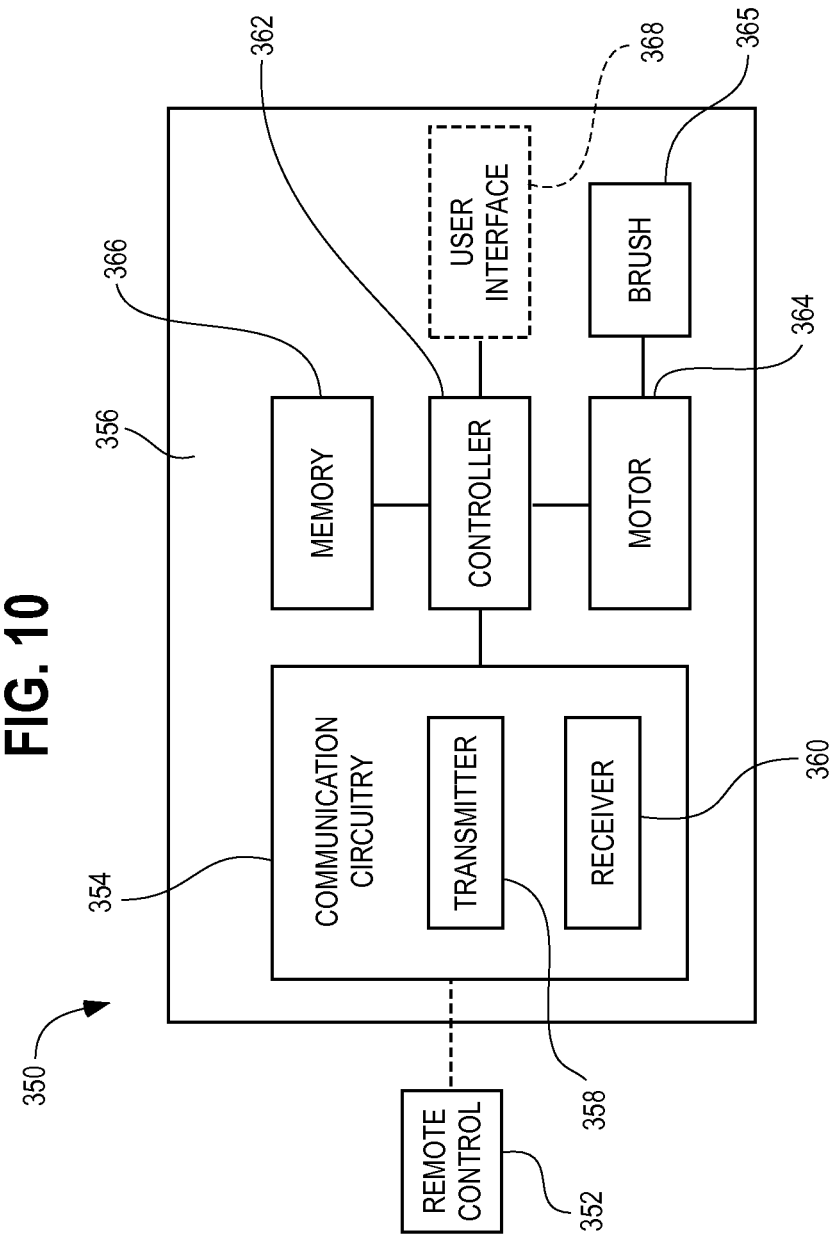
FIG. 10 is a schematic view of a lawn sweeper having a wireless remote control.

As discussed above, the lawn sweeper 10 has a wired remote control 51 for operating the motor 42. With reference to FIG. 10, another lawn sweeper 350 is shown having a wireless remote control 352 that communicates with communication circuitry 354 carried on a body 356 of the lawn sweeper 350. The communication circuitry 354 may include at least one of a transmitter 358 and receiver 360. In one form, the communication circuitry includes a transceiver to handle transmission and receiving functions. As another example, the communication circuitry 354 may include a global positioning system receiver.

The communication circuitry 354 communicates with a controller 362 that can operate a motor 364 of the lawn sweeper 356 according to information received from the remote control 352. The controller 362 may also be connected to a memory 366 for storing information such as user profiles, rotational speeds of the motor 364, brush speed profiles for different modes of operation, global positioning system data, keeping track of the number of basket fills, or other information. The controller 362 may also be connected to a user interface 368 carried on the body 356 that can receive inputs from a user. As one example, the remote control 352 may be a user's mobile phone that communicates with the communication circuitry 354 via Bluetooth and the user interface 368 is a touch screen display that can receive inputs from the user to associate the user's phone with the lawn sweeper 350.

Figure 10A:
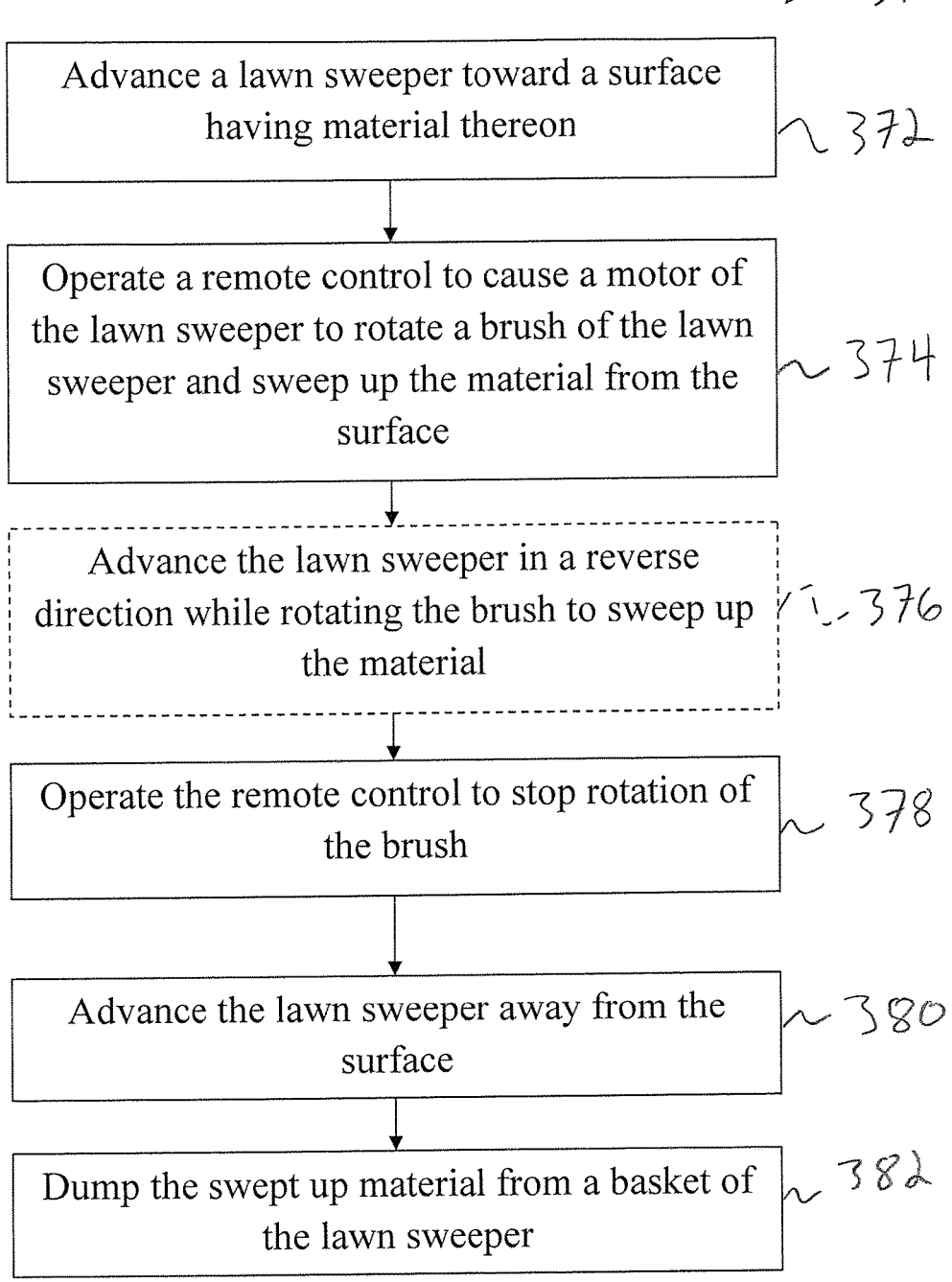
FIG. 10A shows a method of operating a lawn sweeper.

With reference to FIG. 10A, a method 370 of operating the lawn sweeper 10 is provided for sweeping materials from a surface. The method 370 will be discussed with respect to lawn sweeper 10 although the method 370 is equally applicable to the lawn sweeper 350 given the similarities between the lawn sweepers 10, 350. Further, the method 370 may also be implemented using the lawn sweeper 400 and other lawn sweepers discussed below.

The method 370 includes advancing 372 the lawn sweeper 10 toward the surface 32 having material thereon, such as by towing the lawn sweeper 10 with the tractor 12. Advancing 372 the lawn sweeper 10 may include moving the lawn sweeper 10 without rotating the brush 40. The method 370 includes operating 374 the remote control 51 to cause the motor 42 to rotate the brush 40 and sweep up material from the surface 32. The rotating brush 40 sweeps up material on the portion of the surface and the material is collected in the basket 50. Operating 374 the remote control 51 may include simply closing an electric circuit to provide power to the motor 42 which causes the motor 42 to rotate the brush 40 at a speed determined by the characteristics of the motor 42 and pulleys 72, 80. The brush 40 may be rotated at a speed appropriate for a particular application such as in the range of approximately 100 RPM to approximately 1500 RPM, approximately 200 RPM to approximately 1400 RPM, approximately 300 RPM to approximately 1300 RPM, approximately 400 RPM to approximately 1200 RPM, approximately 500 RPM to approximately 1000 RPM, and approximately 600 RPM to approximately 900 RPM. The brush 40 may be rotated at any speed within these ranges, such as approximately 900 RPM.

With reference to lawn sweeper 350, the operating 374 step may include operating the remote control 352 to cause the motor 364 to rotate a brush 365 and may include the controller 362 retrieving motor speed information from the memory 366. The retrieved motor speed information may correspond to a single speed of rotation of the brush, varying speed profiles such as sinusoidal speed profiles, or other speeds. For example, the retrieved speed information may include different speeds for different locations on a user's lawn and the controller 362 may interface with a GPS receiver of the communication circuitry 354 to cause the motor 364 to rotate the brush 365 at different speeds at the different locations on a user's lawn. In one form, the lawn sweeper 350 receives information corresponding to one or more desired brush speeds from the user via the user interface 368, the information from the user is stored in the memory 366, and the operating 374 step includes the controller 366 retrieving the information from the memory 366 and operating the motor 366 according to the retrieved information.

In yet another form, the operating 374 includes the remote control 352 sending information regarding the user's desired brush rotation speed to the controller 362 and the controller 362 operating the motor 364 accordingly. For example, the user could set a brush speed in an application operating on the user's phone which operates as the remote control 352 and the phone transmits information corresponding to the user's desired brush speed to the communication circuitry 354 so that the controller 362 can cause rotation of the brush 365 of the lawn sweeper 350 at the desired speed(s).

Another advantage of the lawn sweepers 10, 350 is that the motors 42, 364 can rotate the brushes 40, 365 and sweep up materials even when the lawn sweepers 10, 350 are moved in reverse. For example, the user 14 may place the tractor 12 in reverse and cause the tractor 12 to back up in order for the lawn sweeper 10 to travel back over the surface 32 and sweep up material that may have been missed on a first pass over the surface 32. The method 370 may therefore include advancing 376 the lawn tractor 10 in a reverse direction while rotating the brush 40 to sweep up material from the surface.

The method 370 includes operating 378 the remote control 51 to stop rotation of the brush 40. The user may operate 378 the remote control 51 once the material has been swept up from the surface and received in the basket 50. Because the user 14 can stop rotation of the brush 40 using the remote control 51, the brush 40 does not need to continue to rotate after the material has been swept up from the surface 32 and while the user 14 drives the lawn tractor 12 away from the surface 32. This stands in contrast to some prior wheel-driven lawn sweepers where the brush of the lawn sweeper continues to rotate as the lawn sweeper is towed away from the swept surface due to the rotation of the drive wheel. This continued rotation of the brush in prior lawn sweepers may be undesirable because the brush continues to sweep up material and may result in an over-filled catch basket.

Next, the user 14 advances 380 the lawn sweeper 10 away from the surface such as by towing the lawn sweeper 10 away from the surface toward a desired dump location. The user 14 then dumps 382 the material from the basket 50, such as by pulling the handle 264 as discussed above with respect to FIGS. 6-9.

It will be appreciated that the method 370 may include sweeping material from two or more spaced locations such as different areas of the user's 14 lawn. In this situation, the lawn sweeper 10 would be advanced 372 toward a first lawn area having material thereon, the user operates 374 the remote control 51 to cause the motor 42 to rotate the brush 40 and sweep material off of the first lawn area. The user operates 378 the remote control 51 to stop rotation of the brush 40 and then advances 372 the sweeper toward a second lawn area having material thereon. The user operates 374 the remote control 51 to cause the motor 42 to rotate the brush 40 and sweep up material from the second lawn area. Once the material has been swept up from the second lawn area, the remote control 51 is operated 378 to stop rotation of the brush 40. The lawn sweeper 10 is towed 380 away from the second lawn area toward a dump area. The user 14 then dumps 382 the material swept up from the first and second lawn areas in the basket 50 by pulling the handle 264.

Figure 11:
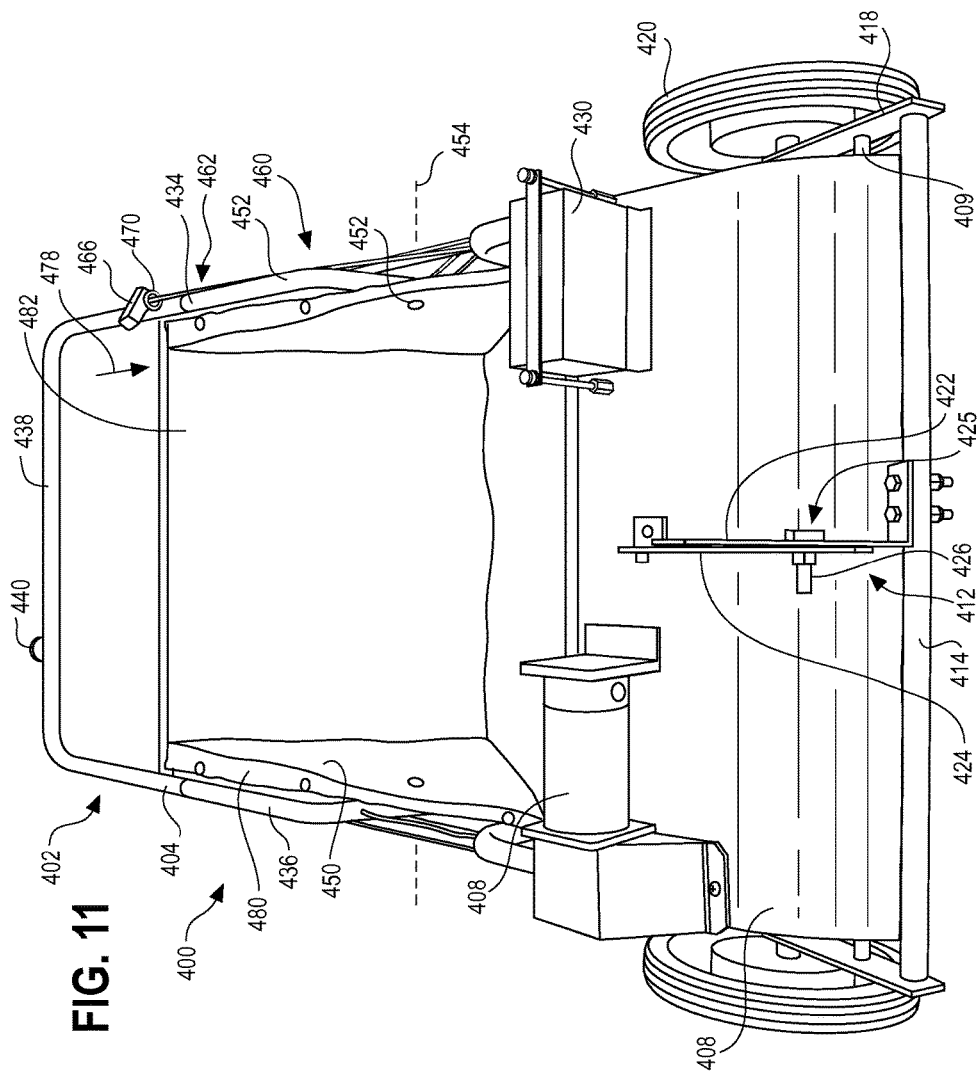
FIG. 11 is a front perspective view of another lawn sweeper showing a motor and a battery mounted to a brush housing of the sweeper.
Figure 12:
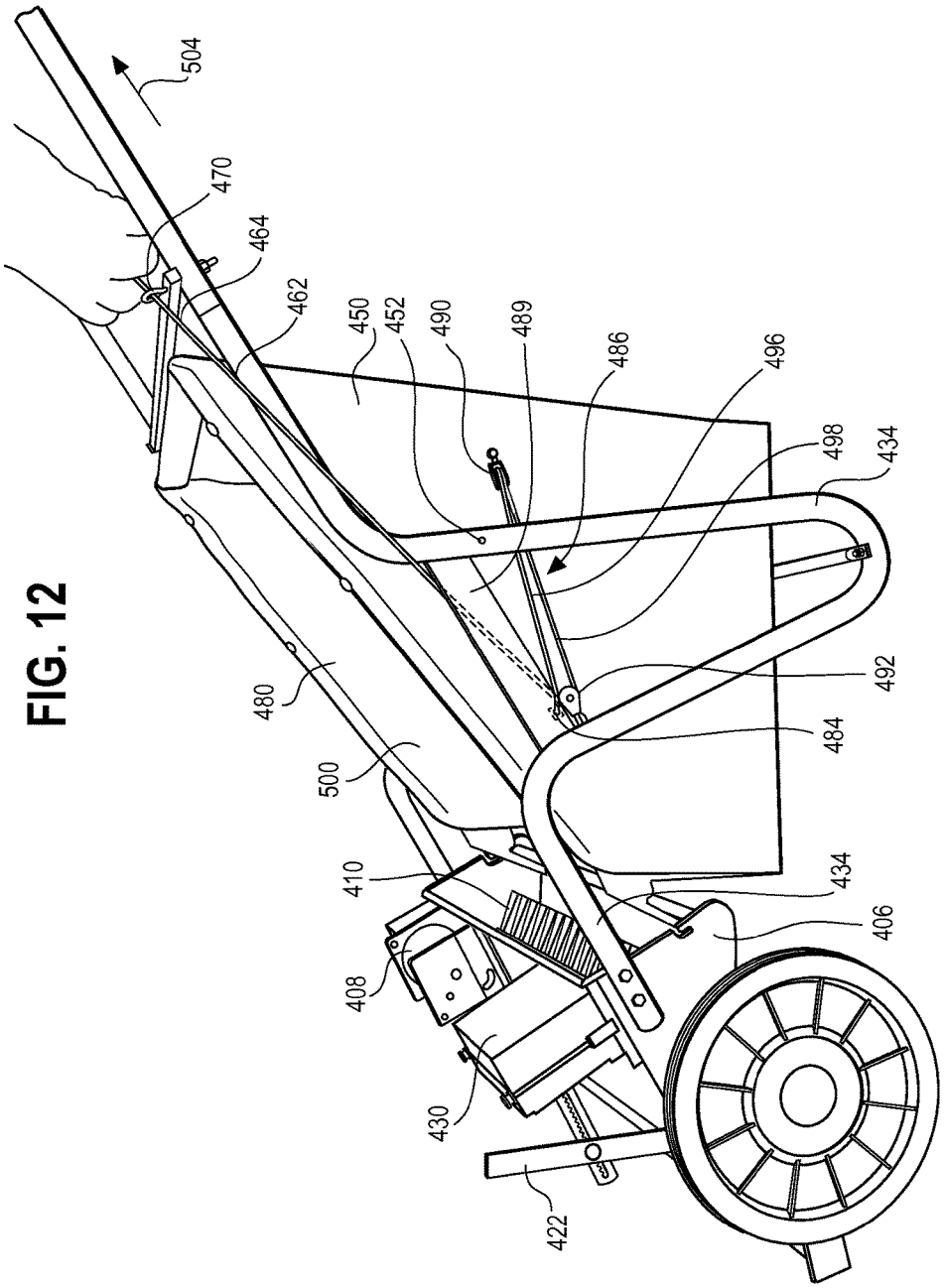
FIG. 12 is a side perspective view of the lawn sweeper of FIG. 11 showing a dump mechanism of the lawn sweeper for pivoting a basket of the lawn sweeper away from the brush.

With reference to FIGS. 11 and 12, a lawn sweeper 400 is provided that is a walk-behind type of lawn sweeper that has many similarities to the lawn sweeper 10 discussed above. In one form, the lawn sweeper 400 has a body 402 including a frame 404, a brush housing 406, and a motor 408. The motor 408 drives a brush 410 rotatably supported in the housing 406 independently of the rotation of wheels 420. The lawn sweeper 400 has a height adjustment mechanism 412 that is substantially similar to the height adjustment mechanism 60 including a support 414 having arm portions 418 pivotally connected to the housing 406 at fixed locations of the housing 406 with pins 409. Further, the height adjustment mechanism 412 includes a height adjustment handle 422 that cooperates with a bar 424 and a height position lock 425 similar to the height position lock 166 for setting the height of the housing 406. One difference from the lawn sweeper 10 is that the lawn sweeper 400 includes a power source, such as a battery 430 for powering the motor 408. It is noted that the lawn sweeper 10 could utilize a battery power source to drive the motor 42 rather than being connected to the electrical system 55 of the tractor 12.

Another difference is that the frame 404 includes side sections 434, 436 that extend rearwardly from the brush housing 406 to a handle 438. There is a user interface, such as a button 440, secured to the handle 438 that permits a user holding the handle 438 to operate the motor 408 and rotate the brush 410. In one form, the lawn sweeper 400 is a push-type sweeper, meaning that the user applies force to the handle 438 to push the lawn sweeper 400 along a surface. However, the lawn sweeper 400 may include a drive motor or other motive source to partially or completely propel the lawn sweeper 400 along the surface.

The lawn sweeper 400 includes a basket 450 sized and configured to fit between the side sections 434, 436 of the frame 404. The basket 450 includes a frame 480 and walls 482 supported by the frame for containing the swept up materials from the brush 410. The basket 450 is pivotally connected to the frame side sections 434, 436 at pins 452 that define a dump axis 454 for the basket 450. To pivot the basket 450 from an operating orientation to a dumping orientation, the lawn sweeper 400 includes a dump mechanism 460 that is similar in many respects to the dump mechanism 29 of the lawn sweeper 10. The dump mechanism 460 includes an elongate actuator such as a rope 462 having a handle end portion 464 with a pull-handle 466. The frame side portion 434 includes an eye 470 smaller than the pull-handle 466 to resist movement of the handle 466 in direction 478 beyond a predetermined position that corresponds to the operating orientation of the basket 450.

With reference to FIG. 12, the rope 462 has an anchor end portion 484 secured to the frame side section 434. The rope 462 also has an intermediate portion 486 intermediate the handle portion 464 and the anchor end portion 484 along the rope 462. The intermediate portion 486 of the rope 462 is connected to the basket 450 and the connection may include a pulley 490 mounted to the frame 480 of the basket 450. Additionally, there may be another pulley 492 mounted to the frame side section 434. The rope 462 extends from the handle end portion 464 downward behind a support plate 489 of the frame side section 434 and into the pulley 492, as shown in FIG. 12. The rope 462 extends from the pulley 492, through the pulley 490, and extends toward the support plate 489 where the anchor end portion 484 is secured to the support plate 489. This arrangement of the pulleys 490, 492 and rope 462 creates a first length 496 and a second length 498 of the intermediate portion 486 of the rope 462.

The anchor end portion 484 is shown extending through an opening in the support plate 489 and a knot in the anchor end portion 484 behind the support plate 489 is larger than the opening in the support plate 489 such that knot does not pull through the opening when the handle 466 is pulled thereby securing the anchor end portion 484 to the support plate 489. As additional examples, the anchor end portion 484 could be tied around a bolt extending from the frame side section 434 or held against the frame side section 434 with a clamp.

With reference to FIGS. 12-15, a method of pivoting the basket 450 from the operating orientation to the dumping orientation will be shown and described. Initially, the basket 450 is oriented in the operating orientation with an opening 500 of the basket 450 positioned to receive material swept up by the brush 410. Once a desired amount of material has been swept up into the basket 450, the user positions the lawn sweeper 400 at a desired dump location and pulls on the pull-handle 466 of the handle end portion 464 in direction 504 to start pivoting the basket 450.

Figure 13:
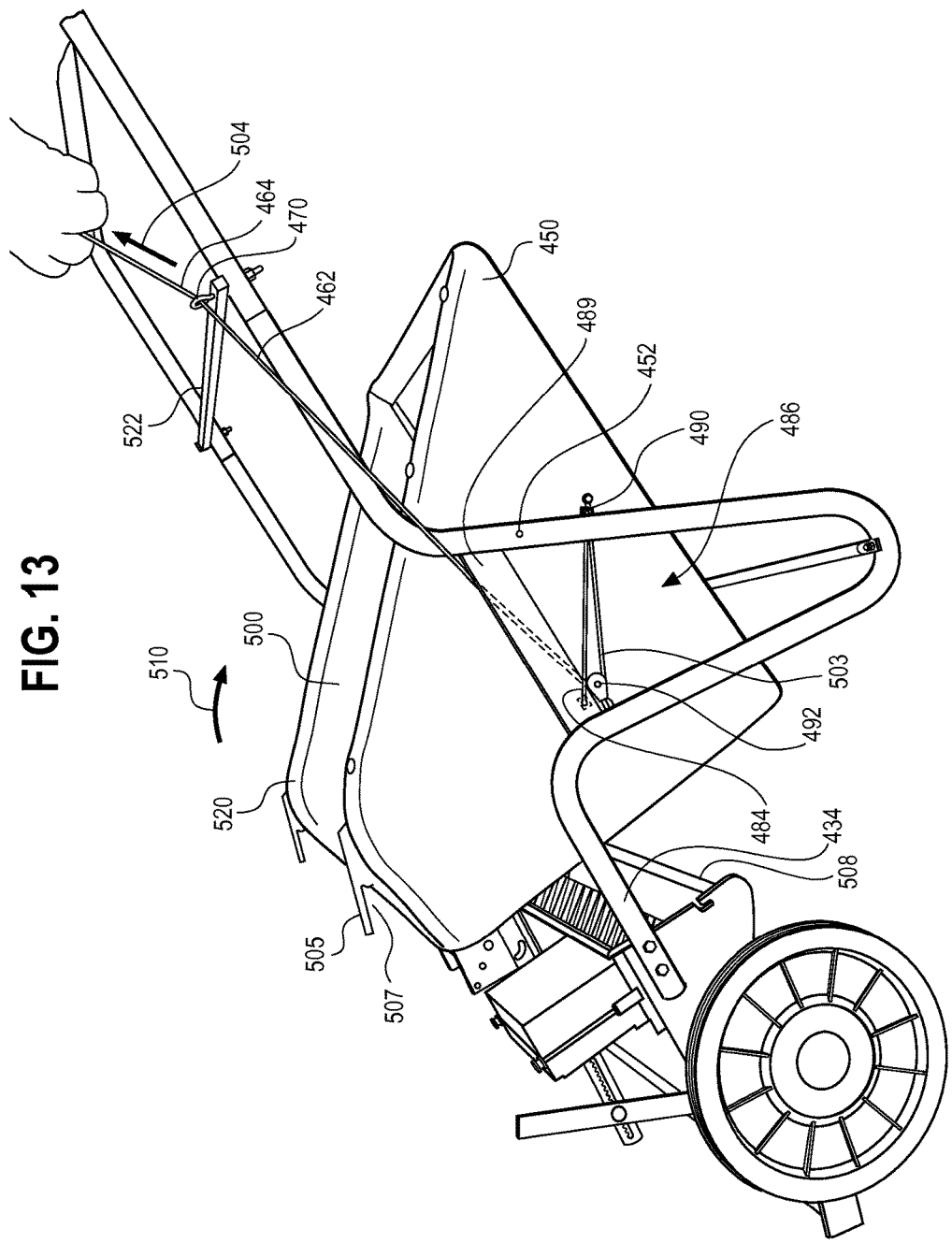
FIG. 13 is a side perspective view similar to FIG. 12 showing a handle of a rope of the dump mechanism being pulled which causes an opening of the basket to pivot upward and away from the brush.

With reference to FIG. 13, the anchor end portion 484 remains secured to the support plate 489 while a section 503 of the intermediate portion 486 travels through pulley 492 toward the eye 470. Because the anchor end portion 484 is secured to the support plate 489, the movement of the section 503 through the pulley 492 and toward the eye 470 draws the pulley 490 toward the pulley 492 and pivots the basket 450 in direction 510 about the pins 452. This lifts the basket opening 500 upward and rearward from the brush 410. As shown in FIG. 13, the basket frame 480 includes legs 505 with gaps 507 that receive a support member 508 with the basket 450 in the operating orientation. Specifically, the support member 508 extends through the gaps 507 and the legs 505 rest on the support member 508. The legs 505 transfer the weight of material received in the basket 450 to the support 508.

Figure 14:
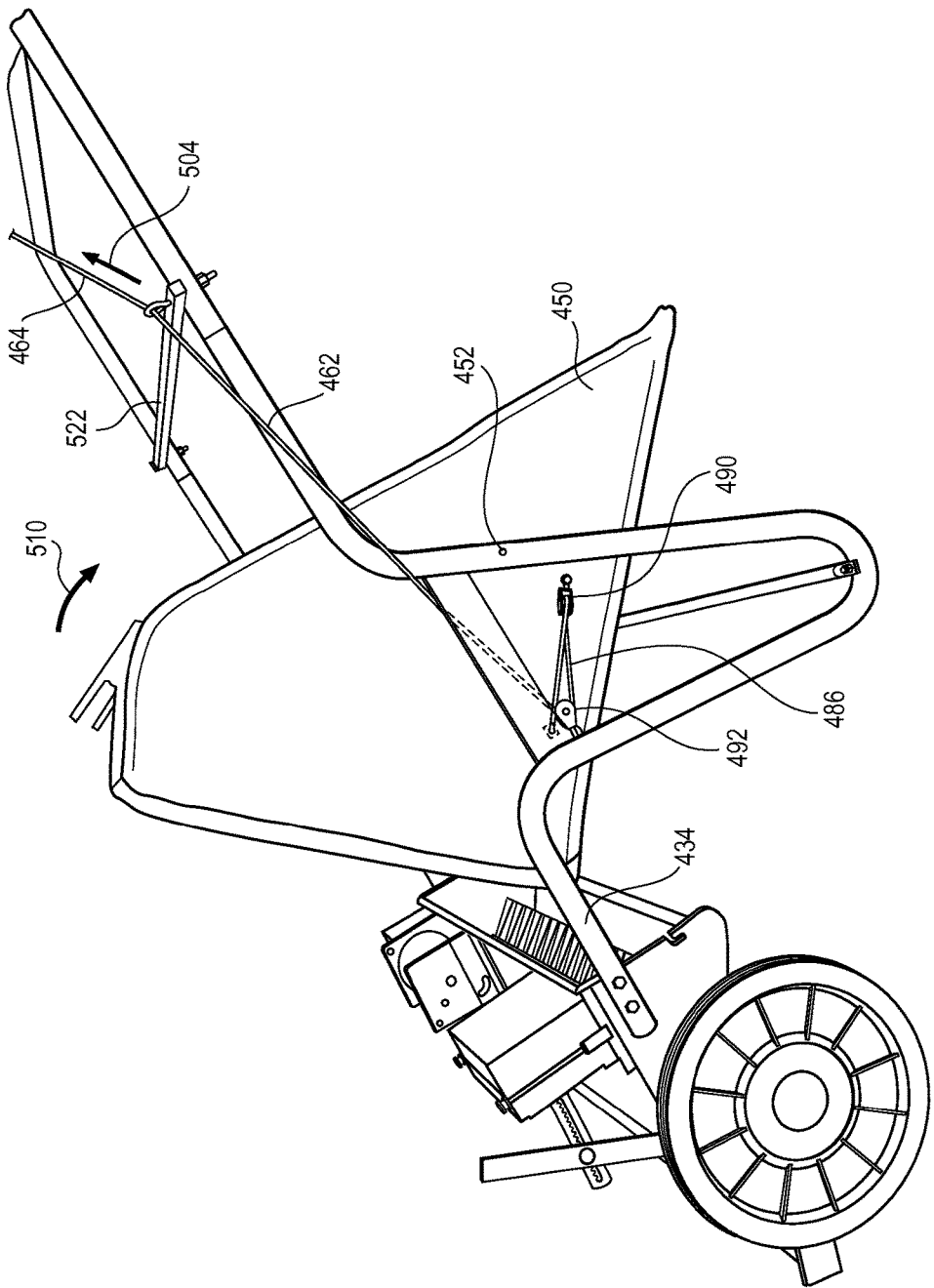
FIG. 14 is a side perspective view similar to FIG. 13 showing pulleys of the dump mechanism being drawn closer to one another due to pulling on the rope.

With reference to FIG. 14, the user continues to pull handle end portion 464 in direction 504 to continue pivoting the basket 450 toward the dumping orientation. This draws more of the intermediate portion 486 through the pulley 492 in direction 504 and draws the pulley 490 closer to the pulley 492. This continues to pivot the basket 450 in direction 510 about the pins 452.

Figure 15:
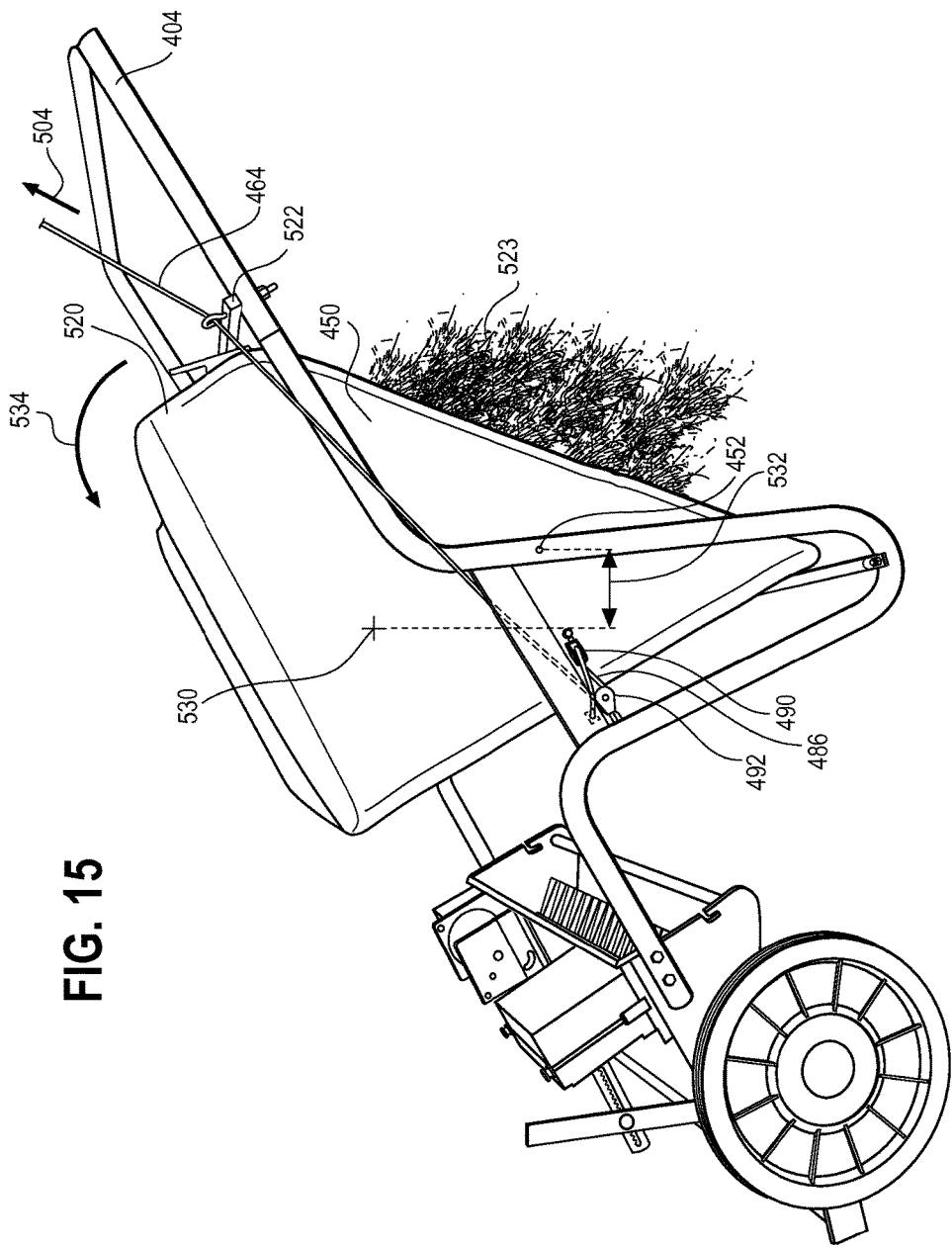
FIG. 15 is a side perspective view similar to FIG. 12 showing the basket in an inverted, dumping orientation and swept material falling out of the basket.

With reference to FIG. 15, the basket frame 480 has a forward end 520 that pivots into contact with a stop, such as a cross bar 522 of the frame 404. This stops the basket 450 from further pivoting and temporarily positions the opening 500 of the basket 450 in an inverted position so that swept up material 523 may fall out of the basket 450. With the basket 450 in the dumping orientation, the handle end portion 464 has pulled a length of the intermediate portion 486 through the pulley 492 and drawn the pulley 490 into close proximity with the pulley 492 which produced pivoting of the basket 450. Like the basket 50, the basket 450 dumps the swept up material 523 away from the brush 450 so that the material 523 does not fall onto the brush 410 and housing 406 and require subsequent cleaning. Also like the basket 50, the basket 450 may have a center of gravity 530 positioned a distance 532 forward of the dump axis 454 defined by the pins 452. This permits the weight of the basket 450 to swing the basket 450 in direction 534 back toward the operating orientation after the user releases the handle end portion 464.

Figure 16:
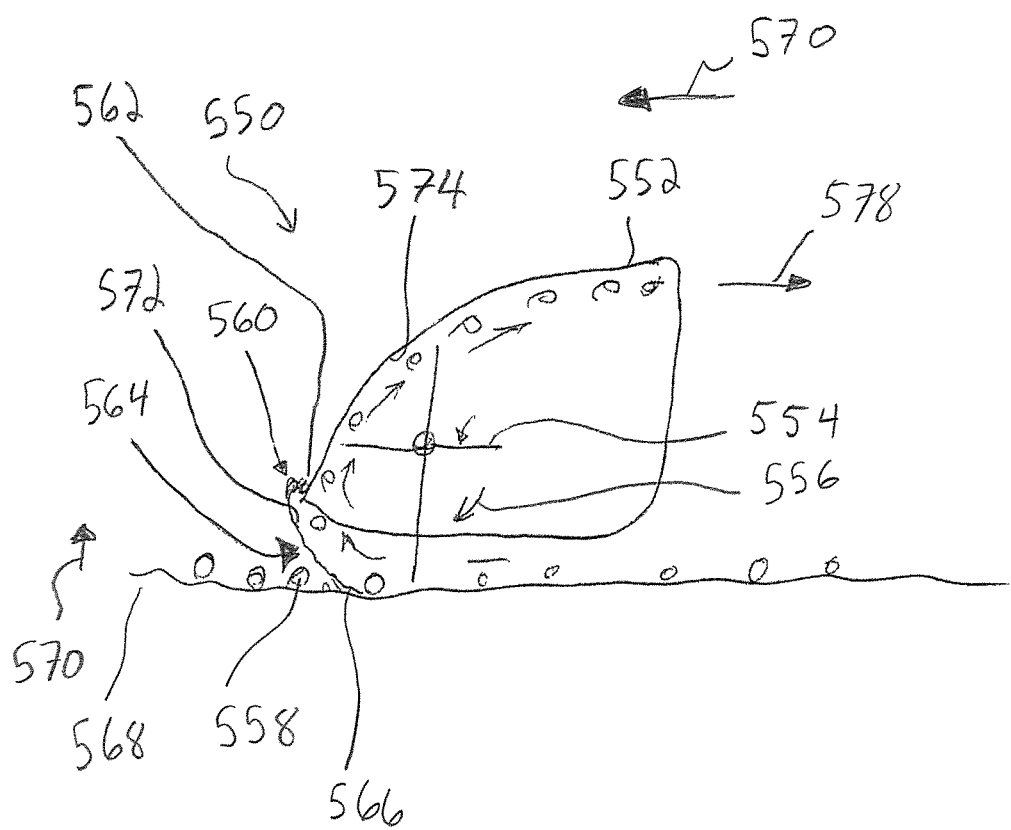
FIG. 16 is a schematic view of a portion of another lawn sweeper having a releasable flap at a forward end of the housing for directing heavier particles swept up by the brush along an inner surface of the housing.

With reference to FIG. 16, a portion of another lawn sweeper 550 is shown. The lawn sweeper 550 has a housing 552 that supports a brush 554 for rotation in direction 556 within the housing 552. It has been discovered that some prior lawn sweepers are inefficient at sweeping up heavy particles, such as nuts or rocks 588, because the brush rotation of these prior lawn sweepers may propel the rocks 558 forwardly of the sweeper rather than sweeping up the rocks 558. The lawn sweeper 550 addresses this issue with a guide 560 that, in one form, includes a releasable connection 562 with the housing 552. This permits the guide 560 to be connected to the housing 552 for sweeping up rocks 558 or other heavy particles but may be removed for lighter particles, such as grass clippings.

The guide 560 in one form is a vinyl flap 564 and the releasable connection 562 that includes one or more snap connections between the vinyl flap 562 and the housing 552. The vinyl flap 564 has a lower end 566 that travels close to or along the surface 568 and can shift upwardly in direction 570 as the lower end 566 contacts the rocks 588. The weight of the vinyl flap 568 pulls the lower end 566 back downwardly shortly after traveling over the rock 558 in direction 570 and before the brush 554 reaches the rock 558. Once the brush 554 reaches the rock 558, the rotating brush 554 may contact the rock 558 and drive the rock 558 upward along an inner surface 572 of the vinyl flap 564 and along an inner surface 574 of the housing and eventually outward in direction 578 into an associated basket.

Figure 17:
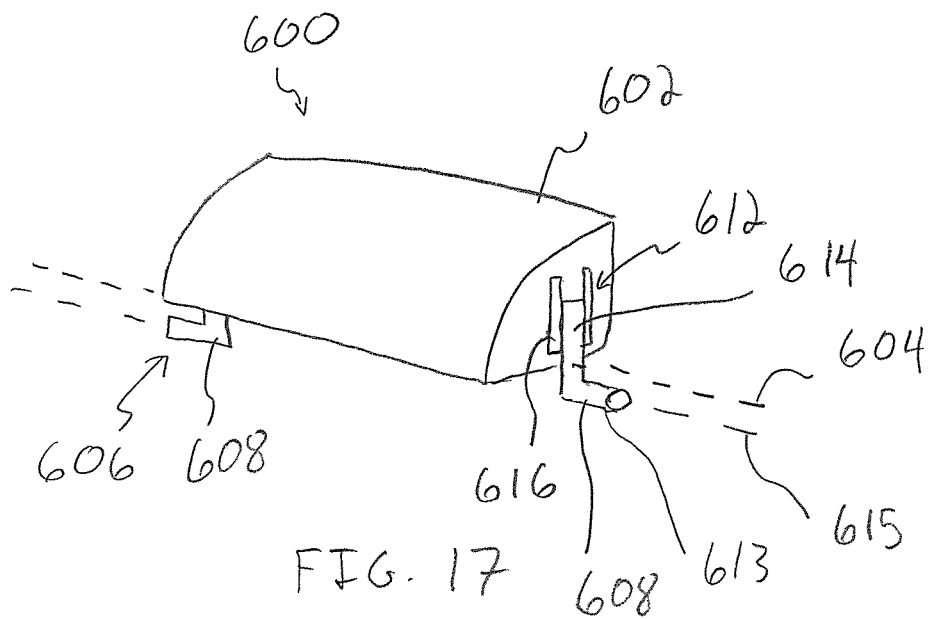
FIG. 17 is a schematic view of a portion of another lawn sweeper having a brush housing and wheel supports connected to the housing with slide connections showing the housing in a raised position.

With reference to FIG. 17, a portion of another lawn sweeper 600 is shown having a brush housing 602 that supports a brush rotatable about a brush axis 604. The lawn sweeper 600 has a support 606 including two members 608 each connected to one side of the housing 602 at a slide connection 612. The slide connection 612 includes cooperating portions 614, 616 of the associated member 608 and the housing 602. Each member 608 has a wheel portion 613 to which a wheel is mounted having an axis of rotation 615.

Figure 18:
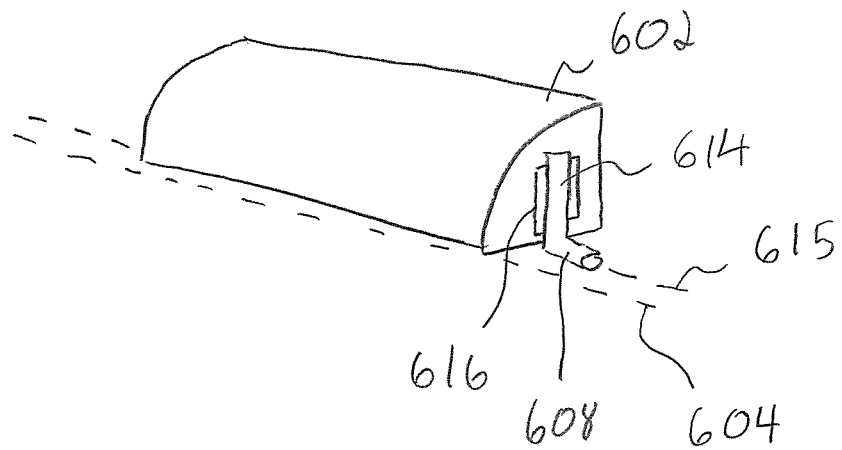
FIG. 18 is a schematic view similar to FIG. 17 showing the housing in a lowered position.

The slide connection 612 aligns the brush axis 604 with the wheel axis 615 and permits the housing 612 to be shifted between a raised position (FIG. 17) and a lowered position (FIG. 18). Rather than pivoting about a fixed pivot point on the housing 602, the members 608 of the support 606 are constrained to slide vertically relative to the housing 602. Because the housing 602 is limited to moving upward and downward, the brush axis 604 and the wheel axis 615 remained vertically aligned with the body 602 in both the raised and the lowered positions. This provides improved resistance to changes in the height of the brush axis 604 as the orientation of the lawn sweeper 600 changes, such as when the lawn sweeper 600 travels over hilly terrain.

The portions 614, 616 may have mating cross sections, such as a mating projection and recess, to provide additional rigidity to the slide connections 612. The slide connections may also have locking mechanisms to fix the position of the support portion 614 relative to the housing portion 616. For example, the support portion 614 may include a spring-biased pin that engages one of a series of holes in the housing portion 616 when the housing 602 is at the desired height.

While there have been illustrated and described particular embodiments of the present invention, it would be appreciated and numerous changes and modifications will occur to those skilled in the art, and it is intended in the appended claims to cover all those changes and modifications which fall within the spirit and scope of the present invention.

What is claimed is:

1. A lawn sweeper for being towed by a lawn tractor and removing material from a surface along which the lawn tractor is driven, the lawn sweeper comprising:

a body having a tongue for being connected to the lawn tractor;

at least one wheel connected to the body for rolling along the surface;

a rotatable brush mounted to the body for removing material from the surface;

a container pivotally connected to the body for collecting material removed from the surface by the rotatable brush, the container having an operating orientation with the container arranged to receive material from the brush and being pivotal upwardly away from the operating orientation to an inverted, discharge orientation that permits the material to fall out of the container;

an electric motor mounted to the body for rotating the brush independently of the rotation of the at least one wheel;

an elongated electrical connector having opposite end portions with one end portion coupled to the electric motor and the other end portion configured to be releasably connected to an electrical system of the lawn tractor to provide power to the motor;

a remote control of the electrical connector intermediate the end portions thereof, the remote control configured to be manipulated by a user on the lawn tractor to control power through the electrical connector to the motor;

a flexible, elongate actuator connected to the container and including a handle portion operable to be pulled to cause the container to pivot from the operating orientation to the discharge orientation.

2. The lawn sweeper of claim 1 wherein the remote control includes a switch of the electrical connector.

3. The lawn sweeper of claim 1 in combination with a lawn tractor for towing the lawn sweeper.

4. The lawn sweeper and lawn tractor of claim 3 wherein the lawn tractor has a seat and the remote control is arranged to be operated by a user riding in the seat.

5. The lawn sweeper of claim 1 further comprising a gear belt or chain operably connecting the motor and the brush.

6. The lawn sweeper of claim 1 wherein the brush is rotatable about a brush axis and the motor has a rotatable drive shaft operably coupled to the brush by a flexible drive member; and a motor mount of the body permits pivoting of the motor and drive shaft thereof about an adjustment axis that extends substantially parallel to the brush axis to adjust tension in the flexible drive member.

7. The lawn sweeper of claim 1 wherein the remote control has a base for being mounted near a footrest of the lawn tractor and a button supported by the base that can be pressed by the user to control the motor.

8. The lawn sweeper of claim 1 wherein the at least one wheel comprises only two wheels connected to the body.

9. A lawn sweeper comprising:
a pair of wheels;
a body shiftable between raised and lowered positions relative to the wheels;
a brush mounted to the body and rotatable about a brush axis;
a motor mounted to the body and operably coupled to the brush for rotating the brush about the brush axis;
a basket supported by the body for receiving material swept up by the brush;
a support having the wheels rotatably mounted thereto so that the wheels are rotatable around a common wheel axis;

a pivot connection between the support and the body at a fixed location of the body, the pivot connection defining a pivot axis for the support that is spaced from the brush axis;

the support being configured to pivot relative to the wheel axis and shift the body and brush mounted thereto between the raised and lowered positions with pivoting of the support about the pivot axis, the brush axis being spaced from the wheel axis by a variable distance as the body and brush mounted thereto shift between the raised and lowered positions.

10. The lawn sweeper of claim 9 wherein the fixed location of the body includes a pair of fixed locations and the support includes a pair of pivot arms, each pivot arm having a pivot portion pivotally connected to the body at one of the fixed locations and a wheel support portion to which one of the wheels is mounted spaced from the pivot portion.

11. The lawn sweeper of claim 9 wherein the body includes a housing for the rotatable brush with lateral side portions on opposite ends of the brush and the pivot connection between the support and the body includes a pivot connection at each of the lateral side portions of the housing.

12. The lawn sweeper of claim 9 wherein the pivot axis for the support extends substantially parallel to the brush axis and the wheel axis.

13. The lawn sweeper of claim 12 wherein the body and the support separate the brush axis from the pivot axis and the wheel axis from the pivot axis by substantially same distance.

14. The lawn sweeper of claim 9 wherein the fixed location of the body includes a pair of fixed locations of the body and the support includes a pair of arm portions pivotally connected to the body at the fixed locations and a cross member connecting the arm portions to pivot the arm portions together relative to the body.

15. The lawn sweeper of claim 14 further comprising an adjustable linkage connecting the cross member to the body for selectively inhibiting pivoting of the arm portions relative to the body.

16. The lawn sweeper of claim 9 wherein the body includes a tongue for connecting the body to a lawn tractor.

17. The lawn sweeper of claim 16 in combination with a lawn tractor.

18. The lawn sweeper of claim 9 wherein the brush axis is spaced from the wheel axis by a first distance with the body in the raised position and the brush axis is spaced from the wheel axis by a different, second distance with the body in the lowered position.

19. A lawn sweeper for removing material from a surface, the lawn sweeper comprising:
a pair of wheels rotatable about a common wheel axis;
a body shiftable between raised and lowered positions relative to the wheels;
a brush mounted to the body and rotatable about a brush axis extending parallel to the wheel axis, the brush axis being substantially vertically aligned with the wheel axis with the body in the raised position and the lowered position;
a motor mounted to the body and operably coupled to the brush for rotating the brush about the brush axis;
a basket supported by the body for receiving material swept up by the brush from the surface;
a support having the wheels rotatably mounted thereto;
a pivot connection between the support and the body at fixed location of the body, the pivot connection defining a pivot axis for the support that is laterally spaced relative to the brush axis; and the support being configured to pivot about the wheel axis and shift the body and brush mounted thereto between the raised and lowered positions relative to the wheels with pivoting of the support about the pivot axis, the brush axis being spaced from the wheel axis by a variable distance as the body and brush mounted thereto shift between the raised and lowered positions.

20. The lawn sweeper of claim 19 wherein the brush axis is above the wheel axis with the body in the raised position and the brush axis is below the wheel axis with the body in the lowered position.

21. The lawn sweeper of claim 19 wherein the brush axis travels along an arc as the body shifts between the raised and lowered positions.

22. The lawn sweeper of claim 21 wherein the arc intersects the wheel axis as the body shifts between the raised and lowered positions so that the brush axis and wheel axis are coaxial with the brush axis at a predetermined position along the arc.

23. The lawn sweeper of claim 19 wherein the brush axis is spaced from the wheel axis by a first distance with the body in the raised position and the brush axis is spaced from the wheel axis by a different, second distance with the body in the lowered position.

24. A sweeper for removing material from a surface, the sweeper comprising:
 a body;
 a pair of wheels connected to the body;
 a brush rotatable relative to the body for removing material from a surface with rotation of the brush;
 a container for receiving material removed from the surface by the brush and being pivotally supported by the body, the container being pivotal upwardly away from the brush from an operating orientation with the container arranged to receive material from the brush to an inverted, discharge orientation that permits the material to fall out of the container;
 a flexible, elongate actuator for pivoting the container;
 a handle end portion of the elongate actuator for being pulled;
 an anchor end portion of the elongate actuator fixed to the body and spaced from the handle end portion along the elongate actuator;
 an intermediate portion of the elongate actuator intermediate the handle end portion and the anchor end portion, the intermediate portion being looped around a redirecting member connected to the container and including a first length extending between the anchor end portion and the redirecting member and a second length extending between the redirecting member and the handle end portion, the elongate actuator permitting the handle end portion to be pulled which shortens the first length and lengthens the second length and causes pivoting of the container from the operating orientation to the discharge orientation while the anchor end portion remains stationary relative to the body;
 a forward portion of the body configured to be connected to a vehicle; and
 a riser upstanding from the forward portion of the body and configured to position the handle end portion of the elongate actuator spaced above the forward portion of the body and permit the handle end portion to be pulled to cause pivoting of the container from the operating orientation to the discharge orientation.

25. The sweeper of claim 24 wherein the redirecting member includes a pulley mounted to the container and configured to multiply the pulling force applied to the handle end portion of the elongate actuator.

26. The sweeper of claim 24 wherein the redirecting member includes a first pulley; and
 a second pulley mounted to the body for engaging the intermediate portion of the elongate actuator and providing a mechanical advantage to pivot the container from the operating orientation to the discharge orientation.

27. The sweeper of claim 24 wherein the forward portion of the body includes a tongue for being connected to a vehicle.

28. The sweeper of claim 24 further comprising a motor mounted to the body and operably coupled to the brush for rotating the brush relative to the body.

29. The sweeper of claim 24 wherein the redirecting member includes a first pulley;
 a second pulley mounted to the body for engaging the second length of the intermediate portion of the elongate actuator;
 a third pulley connected to the container for engaging the second length of the intermediate portion of the elongate actuator; and
 a fourth pulley mounted to the body for engaging the second length of the intermediate portion of the elongate actuator,
 wherein the second and third pulleys are intermediate the first and fourth pulleys along the elongate actuator.

30. The sweeper of claim 24 wherein the handle end portion of the elongate actuator includes a flexible member and a handle; and
 the riser includes an eyelet having an opening sized to permit the flexible member to extend therethrough and resist the handle from passing through the opening.

31. The sweeper of claim 24 wherein the flexible, elongate actuator includes a rope.

* * * * *